(12) United States Patent
Ohki

(10) Patent No.: US 7,483,697 B2
(45) Date of Patent: Jan. 27, 2009

(54) SYSTEM FOR MANAGING MOBILE NODE IN MOBILE NETWORK

(75) Inventor: Masahiro Ohki, Tokyo (JP)

(73) Assignee: NEC Corporation, Tokyo (JP)

( * ) Notice: Subject to any disclaimer, the term of this patent is extended or adjusted under 35 U.S.C. 154(b) by 837 days.

(21) Appl. No.: 10/471,613

(22) PCT Filed: Mar. 12, 2002

(86) PCT No.: PCT/JP02/02301

§ 371 (c)(1),
(2), (4) Date: Sep. 12, 2003

(87) PCT Pub. No.: WO02/073907

PCT Pub. Date: Sep. 19, 2002

(65) Prior Publication Data

US 2004/0137888 A1 Jul. 15, 2004

(30) Foreign Application Priority Data

Mar. 13, 2001 (JP) .............................. 2001-070119
Mar. 13, 2001 (JP) .............................. 2001-070120

(51) Int. Cl.
*H04Q 7/20* (2006.01)

(52) U.S. Cl. .................. 455/432.1; 455/433; 455/435.1; 370/338; 370/401

(58) Field of Classification Search ............... 455/432.1, 455/433, 435.1; 370/338, 401
See application file for complete search history.

(56) References Cited

U.S. PATENT DOCUMENTS 6,147,986 A * 11/2000 Orsic .......................... 370/349

(Continued)

FOREIGN PATENT DOCUMENTS

EP 0 967 769 A2 12/1999

(Continued)

OTHER PUBLICATIONS

Japanese Office Action dated Aug. 12, 2003 with Partial English Translation.

(Continued)

*Primary Examiner*—Joseph Feild
*Assistant Examiner*—Khai M Nguyen
(74) *Attorney, Agent, or Firm*—McGinn IP Law Group, PLLC

(57) ABSTRACT

A mobile node MN registers a care-of address CoA of a destination with a home agent HA. A node CN to communicate with the mobile node MN inquires a name server DNSY about the care-of address CoA of the mobile node. The name server DNSY obtains the care-of address CoA from the home agent HA and sends it to the node CN in reply. The node CN communicates with the mobile node MN by using the care-of address as the destination address. Alternatively, an access router provided in a subnet holds the care-of address CoA, and forwards packets to the mobile node. This reduces the control traffic and eliminates the triangle routing.

8 Claims, 18 Drawing Sheets

U.S. PATENT DOCUMENTS

| | | | |
|---|---|---|---|
| 6,614,774 B1 * | 9/2003 | Wang | 370/338 |
| 6,804,221 B1 * | 10/2004 | Magret et al. | 370/338 |
| 6,904,466 B1 * | 6/2005 | Ishiyama et al. | 709/245 |
| 6,915,325 B1 * | 7/2005 | Lee et al. | 709/202 |
| 2001/0053694 A1 * | 12/2001 | Igarashi et al. | 455/433 |
| 2002/0057657 A1 * | 5/2002 | La Porta et al. | 370/331 |
| 2003/0021275 A1 * | 1/2003 | Shabeer | 370/393 |

FOREIGN PATENT DOCUMENTS

| | | |
|---|---|---|
| JP | 11-298950 | 10/1999 |
| JP | 2000-183971 | 6/2000 |

OTHER PUBLICATIONS

Shingo Murakami, et al., "Route Optimization in Mobile IP with Boundary Routers", *IPSJ SIG Notes, Information Processing Society of Japan*, vol. 99, No. 97, pp. 7-12, Nov. 25, 1999.

Kazuhiro Shitama, et al., "Design and Implementation of Mobility Oriented Network Architechture", *IPSJ SIG Notes, Information Processing Society of Japan*, vol. 99, No. 50, pp. 49-56, May 28, 1999.

* cited by examiner

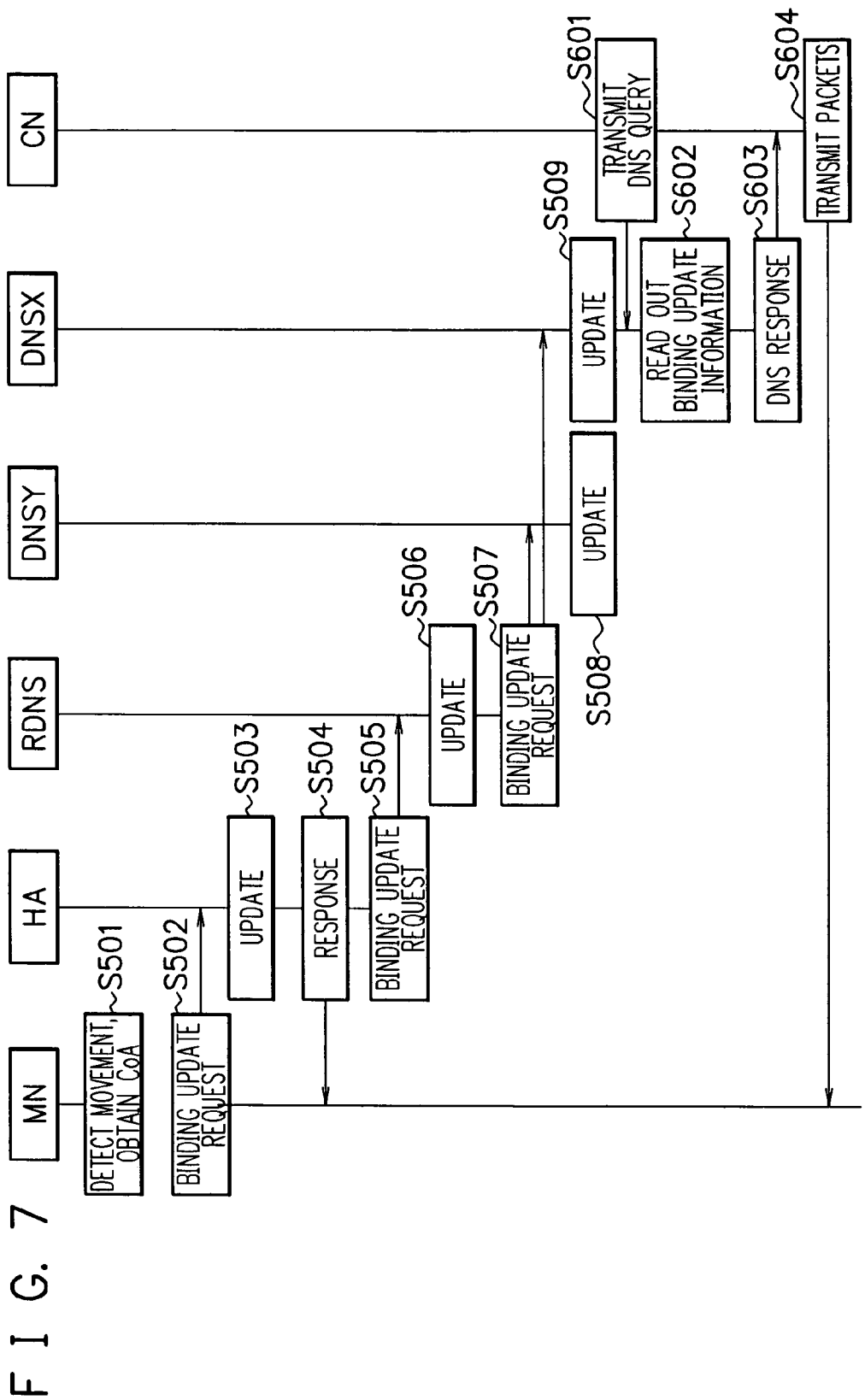
F I G. 7

| NAI/URI | CoA |
|---|---|
| goro@nec.com | Y:b |
| hanako@nec.com | Y:c |
| taro@biglobe.ne.jp | M:d |
| jiro@biglobe.ne.jp | N:e |
| ... | |

(2)

| NAI/URI | CoA | sa | POINTER |
|---|---|---|---|
| goro@nec.com | Y:b | | |
| hanako@nec.com | Y:c | | |
| ohki@nec.com | Y:a | | ● |
| zzz@abc.com | Y:z | | |
| ... | | | |

(1)

⇒

| NAI/URI | CoA | sa | POINTER |
|---|---|---|---|
| goro@nec.com | Y:b | | |
| hanako@nec.com | Y:c | | |
| ohki@nec.com | X:a | | |
| zzz@abc.com | Y:z | | |
| ... | | | |

(3)

F I G. 17
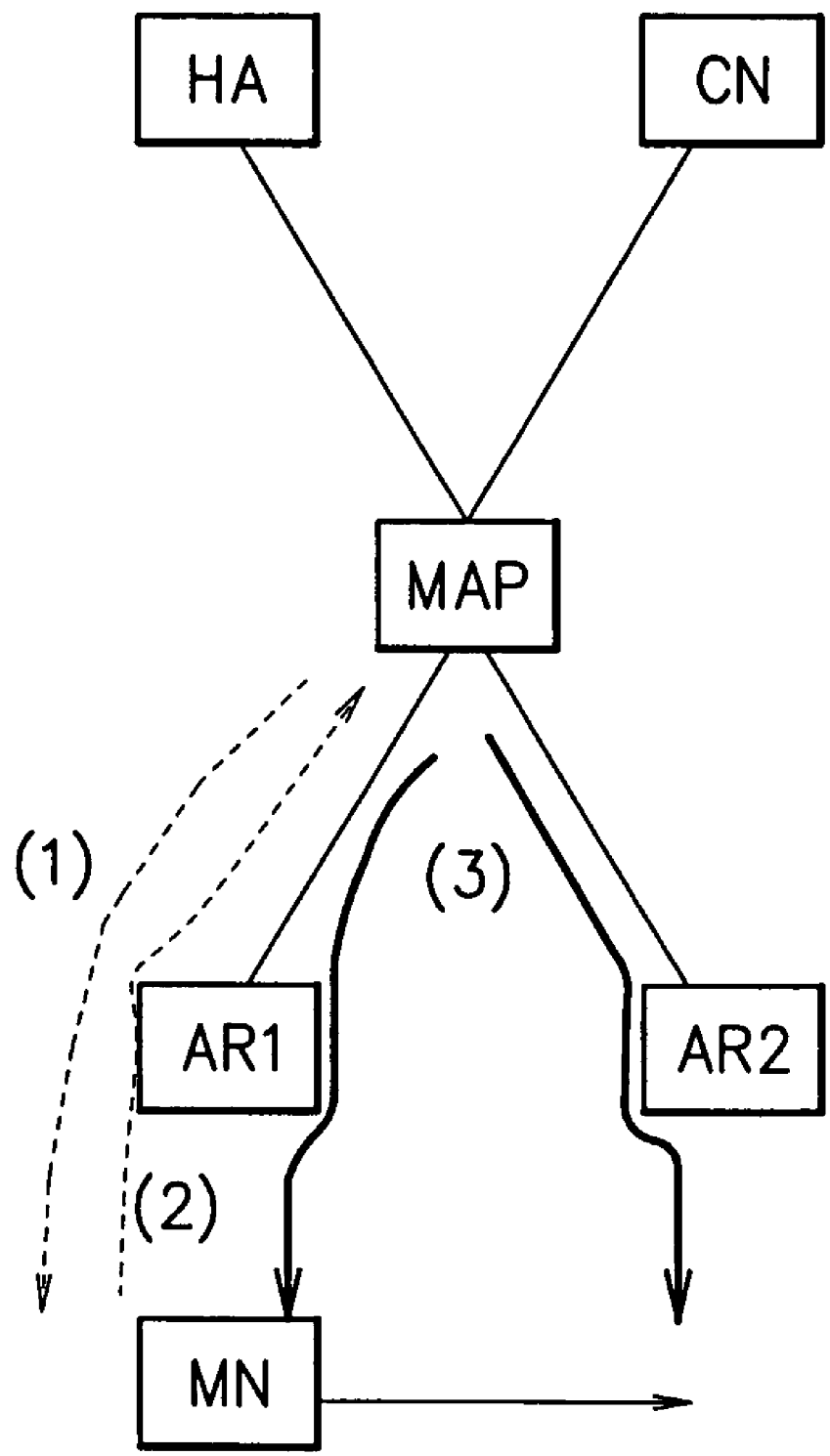

SYSTEM FOR MANAGING MOBILE NODE IN MOBILE NETWORK

TECHNICAL FIELD

The present invention relates to a mobile node managing system comprising a plurality of subnetworks interconnected with each other in a mobile network which offers a packet communication service for mobile nodes each visiting in an arbitrary subnetwork.

BACKGROUND ART

With the amazing progress of the Internet, data services are being rapidly set up in a mobile network which has mainly offered voice-based services. As a consequence, it is likely that data traffic will surpass voice traffic sooner or later. Against such a background, 3GPP (3rd Generation Partnership Project) and 3GPP2 are working on an ALL IP network to develop a voice-based network into a suitable network for the mobile Internet. Besides, in IETF (Internet Engineering Task Force), the Mobile IP WG (working group) to originally discuss IP mobility in the use of LAN comes to consider standardization of a third-generation mobile communication system. Especially, as IPv6 is to replace IPv4 in which there is concern about address deficiencies in the future, IP mobility in IPv6 (Mobility Support in IPv6 <draft-ietf-mobileip-ipv6-12. txt>) is an intensely studied topic in the WG.

According to IPv4 and IPv6, a node that continually moves and changes the connected subnetwork is called "mobile node", the subnetwork to which the mobile node was originally connected is called "home network", a node that is present in the home network and takes charge during the absence of the mobile node is called "home agent", a subnetwork to which the mobile node is actually connected is called "foreign network", a node that is present in the foreign network to look after the mobile node while it is in the foreign network is called "foreign agent", an address that is assigned for the mobile node in the foreign network is called "c/o address" (Care-Of Address; abbreviated to CoA), and an address that is uniquely assigned for the mobile node independently of the connected subnetwork is called "home address". Incidentally, since the mobile node itself and IPv6 mechanism assume the role of the foreign agent, the foreign agent does not exist in IPv6. In addition, the correspondent nodes (Correspondence) of the mobile node include fixed nodes as well as other mobile nodes.

Set out below are general processes according to IPv4 and IPv6.

(1) In the Case where the Mobile Node is in the Home Network

As with the case of ordinary TCP/IP, the mobile node communicates with a correspondent node in the ordinary way.

(2) In the Case where the Mobile Node is not in the Home Network

When the mobile node detects that it is in a network other than the home network, it makes a "binding update request" to notify the home agent of a new CoA through the foreign agent so that all packets to its home address are forwarded to the mobile node. In the case of IPv6, the mobile node sends the binding update request directly to the home agent as shown in FIG. 8.

(2-1) The Arrival of Packets

The packets sent from the correspondent node to the home address arrive at the home network through the mechanism of normal IP routing. The home agent catches the packets by Proxy ARP or the like, and carries out encapsulation to tunnel them to the foreign agent in the network where the mobile node is present. Thus, the mobile node receives the packets via the foreign agent. In IPv6, the mobile node that has received tunnelled packets transmits a new registration request to the correspondent node that sent the packets and notifies the correspondent node of a CoA, as shown in FIG. 8. After that, the correspondent node transmits packets directly to the mobile node using the CoA.

(2-2) The Transmission of Packets

When the mobile node transmits packets to the correspondent node, the header of each IP packet still contains the home address as a source address. In the case where any error occurs on the way, the packets are sent to the home address and, consequently, returns to the mobile node through the above-mentioned mechanism. In the case of IPv6, a CoA is set as the source address, and the home address is indicated as a newly defined destination option.

Additionally, in conventional Mobile IPv6, when a MN (Mobile Node) moves from one subnetwork to another, the MN sends a registration request (Binding Update: hereinafter also referred to as BU) to its HA (Home Agent). In the case where packets from a correspondence node (CN) have been forwarded to the MN through the HA by tunneling as in Mobile IPv4, the MN sends binding update information including a pair of its home address and CoA to the CN on the assumption that the CN has no knowledge of the CoA of the MN. After that, the CN can transmit packets directly to the MN. Herewith, in Mobile IPv6, it is possible to support the route optimization feature for resolving the problem of triangle routing which is a drawback of Mobile IPv4.

Moreover, Mobile IPv6 supports the smooth handoff feature for avoiding a packet loss on the occasion of a handoff. While Mobile IPv6 has improvements over Mobile IPv4, it adopts a flat HA-MN network model as with Mobile IPv4. On this account, the problem of round trip delay is yet not overcome. That is, in the case, for example, where the MN "roams" to a network which is physically distant from the HA, the registration request is delayed by round trip time between the MN and HA. In order to solve the problem, there has been proposed an Internet-Draft (hereinafter referred to as I-D) "Hierarchical Mobile IPv6 mobility management" <draft-ietf-mobileip-hmipv6-01.txt>. According to the I-D, a hierarchical network model comprised of MN-AR (Access Router)-MAP (Mobility Anchor Point)-HA is introduced in Mobile IPv6 as shown in FIG. 17. In the Hierarchical Mobile IPv6, the MAP supports the agent function of the HA to thereby reduce the aforementioned delay in the registration request from the MN.

Besides, according to another I-D "Homeless Mobile IPv6" <draft-nikander-mobileip-homelessv6-00.txt> proposed in the IETF WG held from December 11 until Dec. 15, 2000, the HA and home address are not required as shown in FIG. 18. Originally, in Mobile IPv6, the Binding Updates exchanged between the MN and CNs are used for sharing movement/mobility management information between the MN and CNs. In the Homeless Mobile IPv6, the Binding Update is continued, and the MN retains information called "Host Cache". Thus, it is made possible to implement the movement/mobility management without the HA. As the merit of the Homeless Mobile IPv6, it is indicated in the I-D that the communication between two Homeless supporting Hosts does not require the routing header and home address destination option which are used in Mobile IPv6, and a packet can be transmitted/received by the use of the IPv6 header only. Thus, the header size for the packet can be reduced from 92 to 40 bytes.

Problems that the Invention is to Solve

In the case of IPv4, there is the problem of so-called triangle routing since packets addressed to the mobile node are inevitably transmitted via its home agent. In addition, packets sent from a correspondent node to the mobile node are intercepted by the home agent, and encapsulated and tunnelled to the foreign agent in the network where the mobile node is present. After that, the foreign agent carries out de-capsulation to forward the packets to the mobile node. Such packet encapsulation in the home agent may cause bottlenecks in scaling the packets to fit in a large-scale mobile network.

In the case of IPv6, the mobile node which has received tunnelled packets notifies the correspondent node of the CoA as a binding update request on the assumption that the correspondent node has no knowledge of the CoA, and the correspondent node transmits packets directly to the mobile node using the CoA. This helps to solve the triangle routing problem, a drawback of Mobile IPv4. However, the first packet sent from the correspondent node that has not yet learnt the CoA of the mobile node is inevitably forwarded via the home agent. Therefore, the triangle routing problem remains unresolved with regard to the first packet.

Moreover, according to IPv6, a function for sending binding update requests to correspondent nodes is not an essential function of the mobile node. The mobile node "MAY", in IETF parlance, sends binding update requests, which means that not all the mobile nodes support the binding update function. For this reason, in an advanced mobile network with IPv6, there is apprehension that the problems of triangle routing and packet encapsulation in the home agent may remain unchanged from IPv4.

On the other hand, in the case where the mobile node and correspondent nodes (mobile node, etc.) exchange binding update requests with each other to update information on association between the home address and CoA of each node so that packets can be sent directly to the CoA from the first one, the mobile node has to send/receive binding update requests with considerable frequency if it has many correspondent nodes. Since the mobile node on standby is required to enter transmission mode for transmitting the binding update requests, its battery drain is hastened. In addition, when binding update requests are exchanged between mobile nodes, the binding update requests create a large amount of traffic in radio sections in a large-scale mobile network. The traffic leads to consumption of radio resources to be reckoned with.

The Hierarchical Mobile IPv6 mobility management has shortcomings as described below. The following is an excerpt from 6.1 Mobile node Operation in the I-D:

"The MN may also send a similar BU (i.e. that specifies the binding between the Home Address and the RCoA) to its current correspondent nodes."

That is, as in Mobile IPv6, the MN has to exchange Binding Updates with CNs (MN, etc.) so that each of them can update binding update information. Since the binding update information needs to be updated every time the mobile node moves from one area to another and also refreshed at regular intervals, the mobile node has to send/receive Binding Updates with considerable frequency when it has many CNs to exchange Binding Updates with. The MN on standby is required to enter transmission mode for transmitting Binding Updates, and therefore its battery drain is hastened. Additionally, the MN needs resources (memory, CPU load) to store the binding update information, which affects the miniaturization of the MN as well as the life of its battery.

The following is another excerpt from 6.1 Mobile node Operation in the I-D:

"The MAP will receive packets addressed to the mobile node's RCoA (from the HA or correspondent nodes). Packets will be tunnelled from the MAP to the mobile node's LCoA. The mobile node will de-capsulate the packets and process them in the normal manner."

As is described previously, in Mobile IPv4, packets sent from a CN to the MN are intercepted by the HA, and encapsulated and tunnelled to the FA (foreign agent) in a network visited by the MN. Having received the packets, the FA de-capsulates the packets and forwards them to the MN. Such packet encapsulation in the home agent may cause bottlenecks in scaling packets to fit in a large-scale mobile network. Similarly, in the Hierarchical Mobile IPv6, the MAP encapsulates packets sent from a CN to the MN. Accordingly, the amount of encapsulation process is considered to become a concern in a large-scale mobile network.

Besides, the Homeless Mobile IPv6 has shortcomings as described below. The Homeless Mobile IPv6 also has problems of battery drain of the MN and consumption of radio resources by binding update traffic in a large-scale mobile network because the MN and CNs update their Host Caches using Binding Updates as in the Hierarchical Mobile IPv6. Moreover, in the communication between two Homeless supporting Hosts, it is conceivable that both of them enter new domains at the same time and lose radio links. In this case, both the hosts lose each other's location information (new address information) at once if the worst happens. With this architecture, each of the hosts does not have any means for notifying its correspondent host of a change in address. Incidentally, it may be presumed that this problem does not arise when the correspondent host is a fixed node. Further, when a mobile host receives packets from an unknown or new host for the first time, the new host does not have any means for learning the address of the mobile host. In both cases, support for the HA function is required.

Problems described above are summarized as follows:

(1) the problem of battery drain of the mobile node due to exchanges of binding update requests between the mobile node and correspondent nodes;

(2) the problem of consumption of radio resources due to exchanges of binding update requests between the mobile node and correspondent nodes; and (3) the problem of scalability to a large-scale mobile network encountered in the process of encapsulating packets to the mobile node in the home agent.

It is therefore an object of the present invention to provide a mobile node managing system which solves the aforementioned three problems associated with the prior art.

DISCLOSURE OF THE INVENTION

In accordance with the first aspect of the present invention, there is provided a mobile node management system comprising a plurality of subnetworks interconnected with each other in a mobile network which offers a packet communication service for mobile nodes each having a CoA depending on the subnetwork to which the mobile node is currently being connected and a home address being independent thereof, wherein: each subnetwork includes a home agent which receives a location registration request from the mobile node whose home network is its subnetwork and holds or retains association (binding) between the CoA and home address of the mobile node, and a name server for holding/managing association (binding) between the home address of the mobile node whose home network is its subnetwork and the address of the home agent of the mobile node; and the name server receives a CoA inquiry specifying the home address of the mobile node, and obtains the CoA of the mobile node from the home agent in the home network indicated by the specified home address to respond to the inquiry.

In the mobile node management system in the first aspect of the present invention, when the mobile node moves from one subnetwork to another and makes a location registration request to inform the home agent of a new CoA, the home agent keeps the binding between the CoA and home address of the mobile node. When a correspondent node that intends to communicate with the mobile node sends out an inquiry for a CoA specifying the home address of the mobile node, the name server obtains the CoA of the mobile node from the home agent in the home network indicated by the home address specified in the inquiry to return it to the correspondent node in reply.

Incidentally, the name server obtains the CoA from the home agent of the mobile node and responds to the inquiry if the subnetwork where the server is present corresponds to the home network of the mobile node indicated by the home address specified by the inquiry. However, if there is no correspondence between the two, the server forwards the inquiry to the other name server in the home network of the mobile node to obtain the CoA of the mobile node from the other server.

In accordance with the second aspect of the present invention, there is provided a mobile node management system comprising a plurality of subnetworks interconnected with each other in a mobile network which offers a packet communication service for mobile nodes each having a CoA depending on the subnetwork to which the mobile node is currently being connected and a home address being independent thereof, wherein: each subnetwork includes a home agent which receives a location registration request from the mobile node whose home network is its subnetwork and holds/manages association (binding) between the CoA and home address of the mobile node, and a name server which receives the location registration request from the home agent and holds/manages association (binding) between the CoA and home address of the mobile node; and the name server has a means for receiving a CoA inquiry specifying the home address of the mobile node, and returning the CoA of the mobile node in reply to the inquiry.

In the mobile node management system in the second aspect of the present invention, when the mobile node moves from one subnetwork to another and makes a location registration request to inform the home agent of a new CoA, the home agent registers the binding between the CoA and home address of the mobile node therewith, and also immediately forwards the location registration request to the name server in the same subnetwork to have the server retain the binding between the CoA and home address of the mobile node. When a correspondent node that intends to communicate with the mobile node sends out an inquiry for a CoA specifying the home address of the mobile node, the name server returns the CoA of the mobile node in reply to the inquiry.

Incidentally, the name server returns the CoA retained in the server itself if the subnetwork where the server is present corresponds to the home network of the mobile node indicated by the home address specified by the inquiry. However, if there is no correspondence between the two, the server forwards the inquiry to the other name server in the home network of the mobile node to obtain the CoA of the mobile node from the other server.

In accordance with the third aspect of the present invention, there is provided a mobile node management system comprising a plurality of subnetworks interconnected with each other in a mobile network which offers a packet communication service for mobile nodes each having a CoA depending on the subnetwork to which the mobile node is currently being connected and a home address being independent thereof, wherein: each subnetwork includes a server having a home agent function and a name server function; and the server is provided with a means for receiving a location registration request from the mobile node whose home network is its subnetwork and holding/managing association (binding) between the CoA and home address of the mobile node, and a means for receiving a CoA inquiry specifying the home address of the mobile node and returning the CoA of the mobile node in reply to the inquiry.

In the mobile node management system in the third aspect of the present invention, when the mobile node moves from one subnetwork to another and makes a location registration request to inform the server having a home agent function of a new CoA, the server registers the binding between the CoA and home address of the mobile node therewith. When a correspondent node that intends to communicate with the mobile node sends out an inquiry for a CoA specifying the home address of the mobile node, the server also having the name server function returns the CoA of the mobile node in reply to the inquiry.

Incidentally, if the server does not retain the binding between the CoA and home address of the mobile node specified by the inquiry, the server forwards the inquiry to the other server that retains the binding to obtain the CoA of the mobile node from the other server.

In accordance with the fourth aspect of the present invention, there is provided a mobile node management system comprising a plurality of subnetworks interconnected with each other in a mobile network which offers a packet communication service for mobile nodes each having a c/o address depending on the subnetwork to which the mobile node is currently being connected and a home address being independent thereof, wherein: each subnetwork includes a home agent which receives a location registration request from the mobile node whose home network is its subnetwork, holds/manages association (binding) between the c/o address and home address of the mobile node, and informs a root name server of the binding between the c/o address and home address of the mobile node, and a name server which receives the location registration request from the root name server and holds/manages association (binding) between the c/o address and home address of the mobile node; and the name server has a means for receiving a c/o address inquiry specifying the home address of the mobile node, and returning the c/o address of the mobile node in reply to the inquiry.

In the mobile node management system in the fourth aspect of the present invention, when the mobile node moves from one subnetwork to another and makes a location registration request to inform the home agent of a new CoA, the home agent registers the binding between the CoA and home address of the mobile node therewith, and also immediately forwards the location registration request to the root name server. Upon receipt of the location registration request, the root name server forwards it to the name server in each subnetwork to have the name server retain the binding between the CoA and home address of the mobile node. When a correspondent node that intends to communicate with the mobile node sends out an inquiry for a CoA specifying the home address of the mobile node to the name server in the subnetwork where the correspondent node is present, the name server returns the CoA of the mobile node in reply to the inquiry.

Besides, in the mobile node management system in the first to fourth aspects of the present invention, the respective subnetworks have different network prefixes, the CoA of the mobile node is composed of the network prefix of the subnetwork where the mobile node is present and the interface ID of the mobile node and, for example, a URL that uniquely identifies the home network of the mobile node is used as the home address of the mobile node. destination address in the packets sent from the mobile node to the correspondent node. In addition, the respective subnetworks have different network prefixes, and the CoA of the mobile node is composed of the network prefix of the subnetwork where the mobile node is present and the interface ID of the mobile node.

With the home agent surrogate means of the access router, no encapsulation and de-capsulation are required when the mobile node transmits packets to a correspondent node.

Further, the home agent surrogate means is configured to rewrite and change destination addresses of packets sent from the mobile node in the domain to each correspondent node from the NAI or URI to the CoA to thereby forward them, and also to rewrite and change destination addresses of packets sent to the mobile node in the domain from the CoA to the NAI or URI to forward them to the mobile node. Accordingly, the user of the mobile node can use an address (NAI) in the same address format as a mail address and an address (NAI) of SIP (Session Initiation Protocol).

Still further, the access router is also provided with a means for receiving a registration request (Binding Update) sent from the mobile node when it moves from one subnetwork to another, and a means for sending the binding update table for the mobile node to the access router in the subnetwork where the mobile node is staying after move, receiving it from the access router in the subnetwork where the mobile node stayed before it moved, and taking over the local home agent function for the mobile node. With these means, the access router is able to receive a registration request from the mobile node on behalf of its home agent when the mobile node moves from one subnetwork to another, and automatically transfer the local home agent function to the access router in the subnetwork where the mobile node has moved.

In the mobile node management system in the fifth aspect of the present invention, the access router is further provided with a mobile node

BRIEF DESCRIPTION OF THE DRAWINGS

FIG. 7 is a sequence diagram showing the operation of the system according to the fourth embodiment of the present invention.

FIG. 17 is a diagram showing an example of the prior art (alternate-CoA; MAP address).

Figure 1:
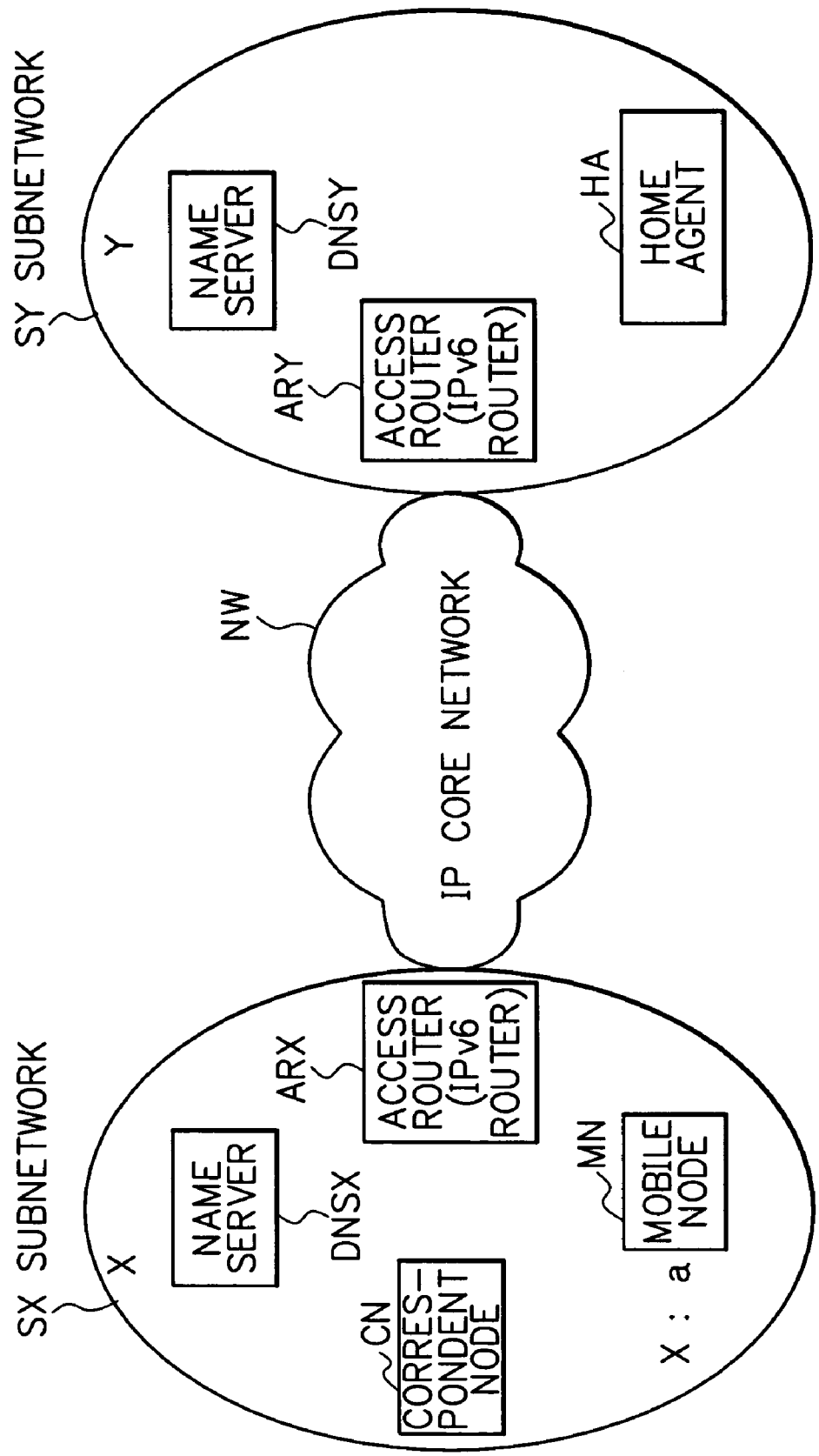
FIG. 1 is a diagram showing the configuration of a system according to the first embodiment of the present invention.

Incidentally, the reference characters MN and N each designate a Mobile Node. The reference character HA designates a Home Agent. The reference characters AR, ARX and ARY each designate an Access Router (IPv6 router). The reference characters DNCX and DNCY each designate a Name Server. The reference character RDNS designates a Root Name Server. The reference character CN designates a Correspondent Node. The reference character NW designates an IP Core Network. The reference characters SX and SY each designate a Subnetwork.

BEST MODE FOR CARRYING OUT THE INVENTION

First Embodiment

Referring now to the drawings, a description will be made in detail of the first embodiment of the present invention.

FIG. 1 is a diagram showing the configuration of a system according to the first embodiment of the present invention. Referring to FIG. 1, the mobile network of this embodiment comprises a plurality of subnetworks SX and SY, access routers or IPv6 routers ARX and ARY provided to the subnetworks SX and SY, respectively, and an IP core network NW, such as the Internet, for connecting the access routers ARX and ARY, and offers a packet communication service for a mobile node MN arbitrarily connected with the subnetwork SX or SY. If the configuration shown in FIG. 1 is applied to the 3G mobile network, the relationship between the access routers ARX, ARY and the mobile node MN corresponds to that of a GGSN (Gateway GPRS Support Node) and a mobile node, or that of a PDSN and a mobile node in the cdma 2000 system.

While one or more mobile nodes can be connected to the respective subnetworks SX and SY, only one mobile node MN is shown in FIG. 1 for purposes of explanation. By the same token, while it is usually the case that there are plural mobile nodes and fixed nodes that serve as correspondent nodes of the mobile node MN, only one correspondent node CN is seen in FIG. 1.

Each of the subnetworks SX and SY includes a home agent that receives a binding update request (location registration request) from the mobile node whose home network is its subnetwork and maintains the association (binding) between the CoA and home address of the mobile node, and a name server that maintains the association (binding) between the home address of the mobile node whose home network is its subnetwork and the address of the home agent of the mobile node. In FIG. 1, only one home agent, namely, the home agent HA of the mobile node MN is shown. Incidentally, FIG. 1 illustrates a situation where the mobile node MN moves from its home network, the subnetwork SY, to a foreign network, the subnetwork SX. As to the name server, the name servers DNSX and DNSY of the respective subnetworks SX and SY are seen in the drawing, and the name server DNSY in the home network of the mobile node MN holds/manages the binding between the home address of the mobile node MN and the address of the home agent HA. The name server, like the name server DNSY, which holds/manages the binding between the home address of the mobile node MN and the address of its home agent HA will be called the home name server of the mobile node MN, and other name servers, like the name server DNSX, will be called visited name servers of the mobile node MN.

In this embodiment, the subnetworks SX and XY have different network prefixes X and Y, respectively. A CoA that the mobile node MN obtains in a visited subnetwork includes the network prefix of the subnetwork. Besides, a URL that uniquely identifies the home network of the mobile node MN is used as the home address of the mobile node MN and, as an example of the URL, ohki@nec.com is used. The home network (subnetwork SY) of the mobile node MN is uniquely identified by the part "nec.com" in this URL.

Figure 2:
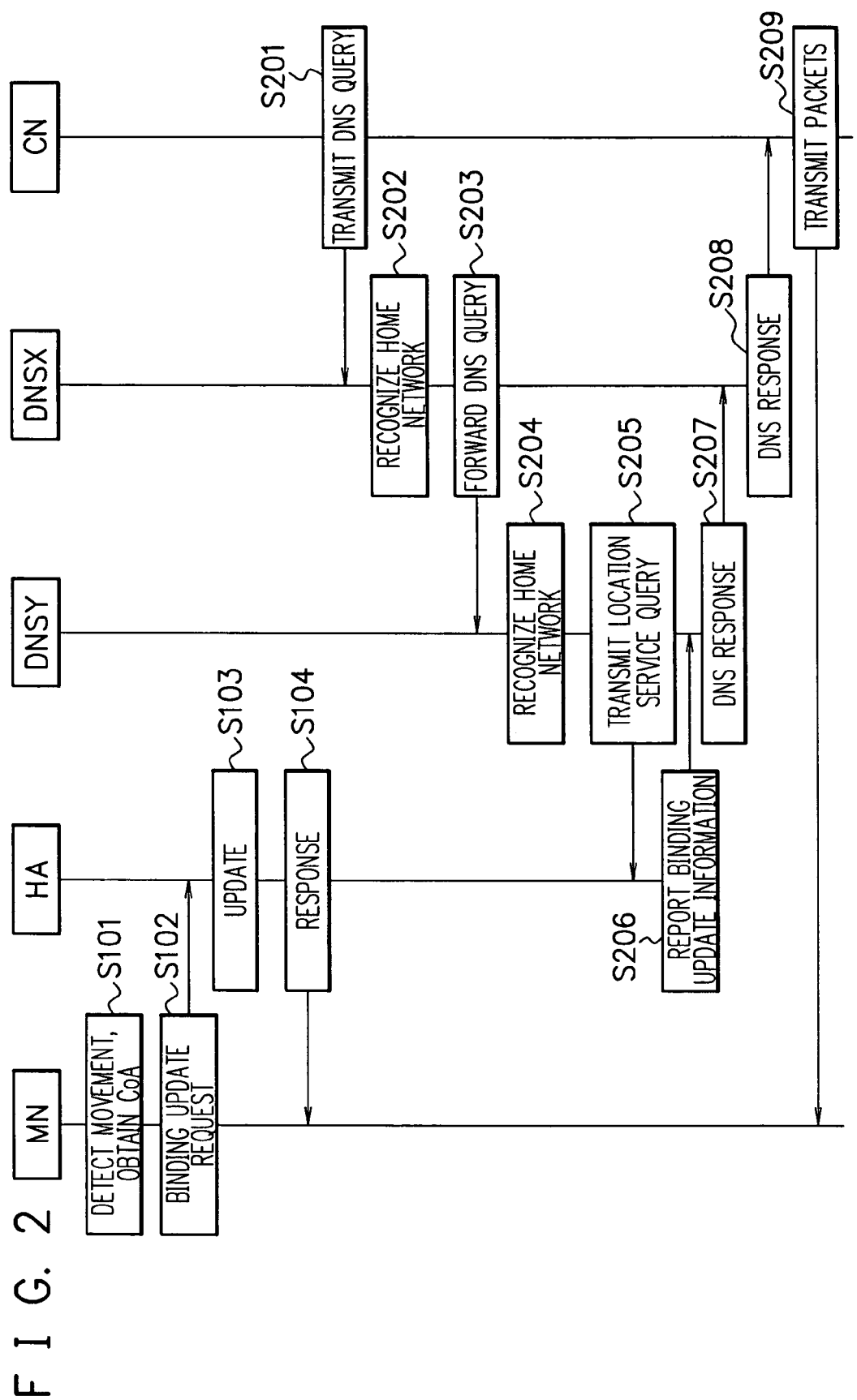
FIG. 2 is a sequence diagram showing the operation of the system according to the first embodiment of the present invention.

FIG. 2 is a sequence diagram showing the operation of the system, that is, the operations of the mobile node, home agent, name server and correspondent node, according to the first embodiment of the present invention. The operations are implemented by computers included in the respective mobile node, home agent, name server and correspondent node that execute programs stored in their memories (the same applies to other embodiments to be hereinafter described). Referring to the drawings, a description will now be made of the operation of the system according to the first embodiment of the present invention.

(1) Location Registration Request (Binding Update Request)

When the mobile node MN has moved from one subnetwork to another, a location registration request is made in the following manner as in IPv6.

When having moved from the subnetwork SY to the subnetwork SX, the mobile node MN detects a move to another subnetwork by a router advertisement in the visited subnetwork as with the conventional mobile node using IPv6, and obtains a CoA (S101 in FIG. 2). The CoA can be obtained by the stateful address auto configuration or the stateless address auto configuration according to DHCP (Dynamic Host Configuration Protocol) v6 (RFC 1971). The new CoA obtained by the mobile node MN is denoted by X:a in FIG. 1. X:a indicates an IPv6 address of 128 bits in length, in which X indicates the network prefix of the subnetwork SX, and a indicates the interface ID of the mobile node MN.

Subsequently, the mobile node MN sends a binding update request to the home agent HA (S102). More specifically, the mobile node MN sends the home agent HA a location registration request packet having the IPv6 header in which the CoA (X:a) of the mobile node MN is set as a source address, the address of the home agent HA is set as a destination address, and the URL of the mobile node MN (ohki@nec.com) is set as a destination option.

Having received the registration request, the home agent HA updates its binding cache, and registers a combination of the notified CoA and URL of the mobile node MN therein (S103). After that, the home agent HA sends a registration response (Binding ACK) to the mobile node MN (S104).

(2) Transmission/Reception of Packets

In the following, operations for transmitting/receiving packets in this embodiment will be explained by taking the case where the correspondent node CN sends packets to the mobile node MN as an example.

Previous to transmitting packets, the correspondent node CN sends an inquiry for the CoA in association with the URL of the mobile node MN to the name server DNSX in the subnetwork SX where it is staying (S201). In other words, the correspondent node CN transmits a DNS Query with the URL of the mobile node MN to the name server DNSX. Having received the DNS Query, the name server DNSX recognizes the network prefix Y of the home network SY of the mobile node MN based on the URL of the mobile node MN (S202). Since the network prefix Y differs from that of its subnetwork SX, the name server DNSX forwards the DNS Query to the name server DNSY (the home name server of the mobile node MN) in the subnetwork SY having the network prefix Y (S203). Incidentally, when the name server DNSX cannot find out the address of the name server DNSY in the home network of the mobile node MN, it retrieves the address from a root name server (Root DNS), being not shown in the drawings, according to the general DNS architecture.

Upon receipt of the DNS Query from the name server DSNX, the name server DSNY recognizes the network prefix Y of the home network SY of the mobile node MN based on the URL of the mobile node MN (S204). Since the network prefix Y matches that of its subnetwork SY, the name server DNSY sends an inquiry for the CoA (Location Service Query) specifying the URL of the mobile node MN to the home agent HA based on its information as to the binding between the URL of the mobile node MN and the address of the home agent HA (S205).

Having received the Location Service Query, the home agent HA reads binding update information of the mobile node MN out of its binding cache using the URL of the mobile node MN as a key, and sends the information back to the name server DNSY (S206). The binding update information of the mobile node MN is forwarded from the name server DNSY to the correspondent node CN via the name server DNSX (S207, S208).

When the correspondent node CN obtains the CoA of the mobile node MN, it sets the CoA as a destination address as in the usual packet transmission, and transmits packets (S209).

Second Embodiment

Referring now to the drawings, a description will be made in detail of the second embodiment of the present invention. The second embodiment of the present invention differs from the first embodiment in that the home agent HA directly notifies the home name server DNSY of the mobile node MN about binding update information on receipt of a location registration request from the mobile node MN. Accordingly, the home name server DNSY of the mobile node MN holds/manages information on the binding (binding update information) between the home address and CoA of the mobile node MN as with the home agent HA.

Figure 3:
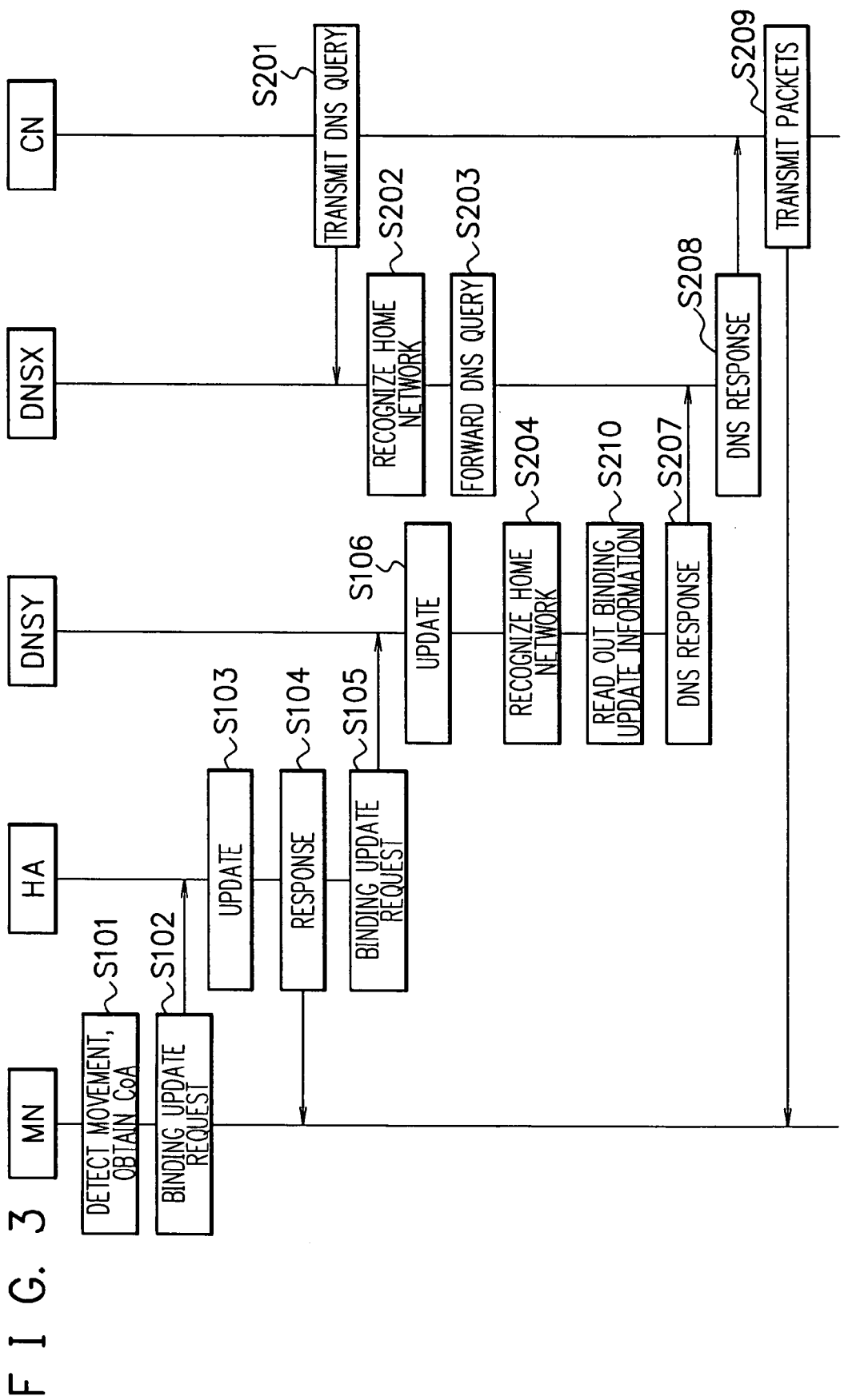
FIG. 3 is a sequence diagram showing the operation of a system according to the second embodiment of the present invention.

FIG. 3 is a sequence diagram showing the operation of a system according to the second embodiment of the present invention. In the following, the operation of the system of this embodiment, mainly about its differences with that of the first embodiment, will be described referring to FIG. 3.

(1) Location Registration Request (Binding Update Request)

When the mobile node MN has moved from one subnetwork to another, the mobile node MN sends a binding update request to the home agent HA, and, in response to the request, the home agent HA updates its binding cache and sends a registration response (Binding ACK) to the mobile node MN as in the first embodiment (S101 to S104). Immediately after updating the CoA of the mobile node MN in the binding cache, the home agent HA sends a binding update request including this binding update information to the home name server DNSY of the mobile node MN (S105). The home name server DNSY updates its information on the binding between the URL and CoA of the mobile node MN based on the binding update request (S106).

(2) Transmission/Reception of Packets

Before the correspondent node CN sends packets to the mobile node MN, the correspondent node CN sends an inquiry for the CoA in association with the URL of the mobile node MN to the name server DNSX in the subnetwork SX where it is staying, the name server DNSX forwards the inquiry to the name server DNSY, and then the name server DSNY recognizes the network prefix Y of the home network SY of the mobile node MN as in the first embodiment (S201 to S204). The name server DNSY reads out its information on the binding (binding update information) between the URL and CoA of the mobile node MN (S210), and sends it to the name server DNSX (S207). The name server DNSX notifies the correspondent node CN of the binding update information (S208).

According to the second embodiment of the present invention, the home name server DNSY is not required to send an inquiry to the home agent HA differently from the first embodiment. Thus, it is possible to reduce response time for the inquiry from the correspondent node CN.

Third Embodiment

Referring now to the drawings, a description will be made in detail of the third embodiment of the present invention. The third embodiment of the present invention differs from the first embodiment in that each subnetwork is provided with a server having a home agent function and a name server function.

Figure 4:
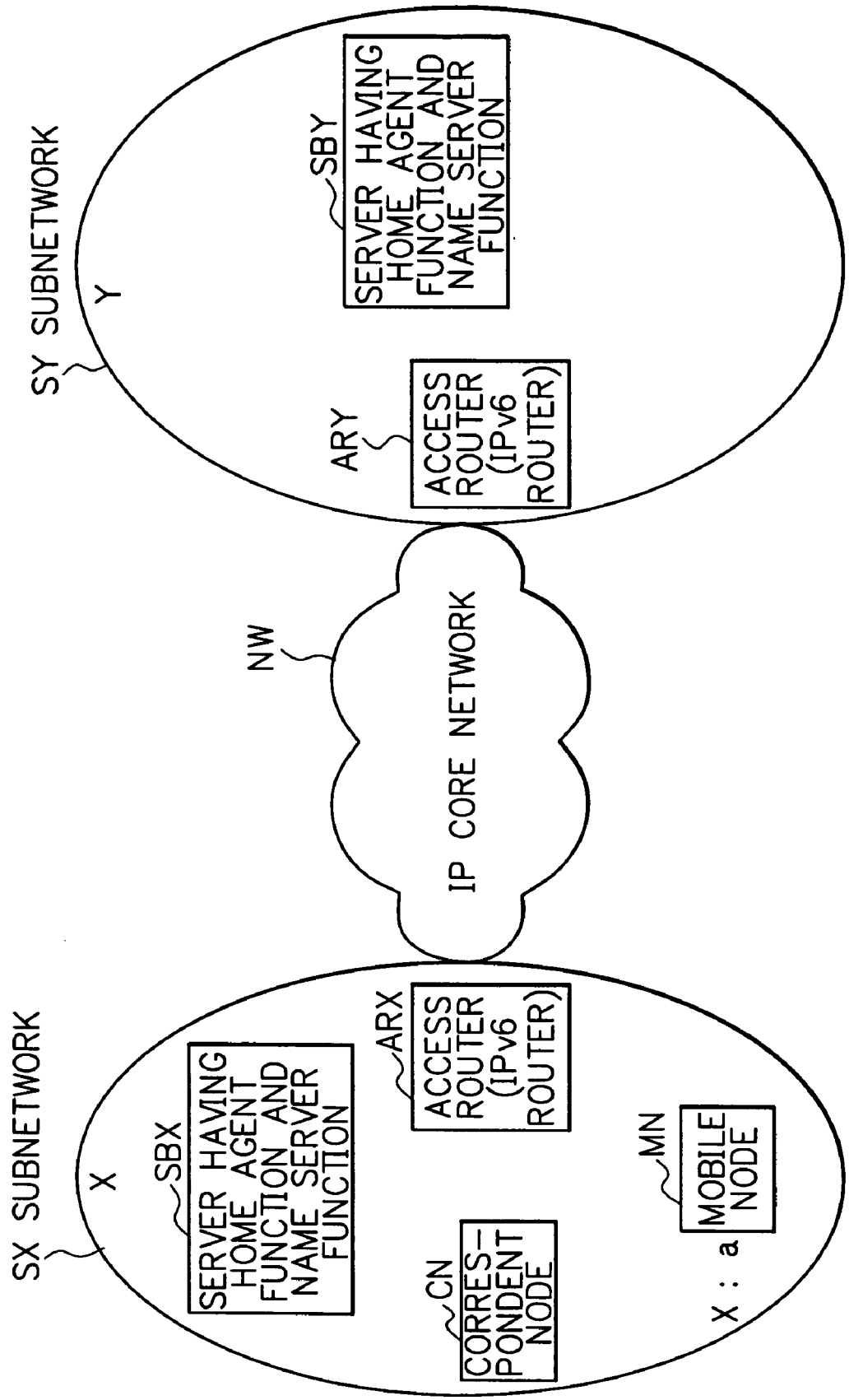
FIG. 4 is a diagram showing the configuration of a system according to the third embodiment of the present invention.
Figure 5:
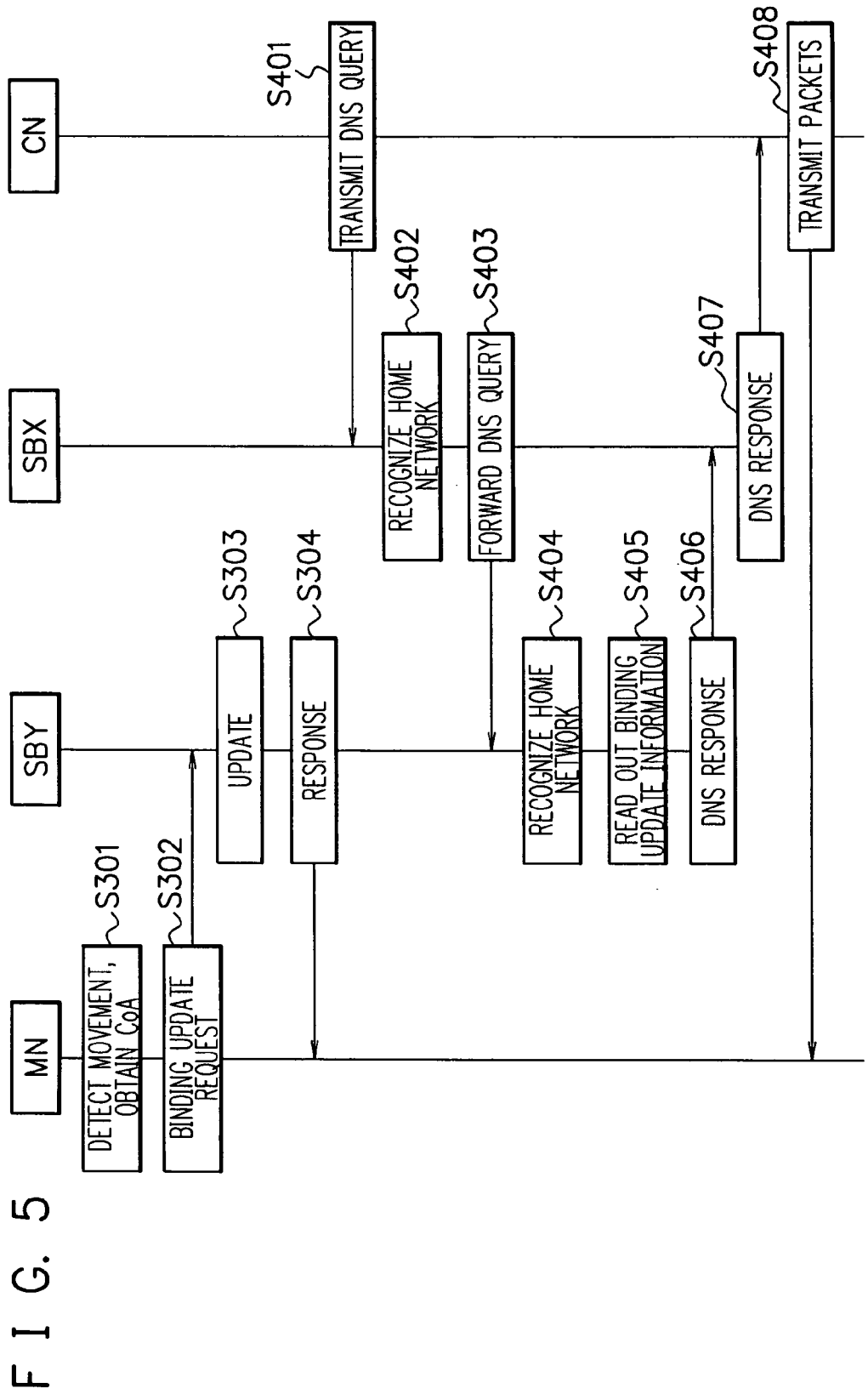
FIG. 5 is a sequence diagram showing the operation of the system according to the third embodiment of the present invention.

FIG. 4 is a diagram showing the configuration of a system according to the third embodiment of the present invention. In FIG. 4, SBX and SBY denote the servers each having a home agent function and a name server function. The system of the second embodiment is otherwise similar to that of the first embodiment. FIG. 5 is a sequence diagram showing the operation of the system according to the third embodiment of the present invention. In the following, the operation of the system of this embodiment, mainly about its differences with that of the first embodiment, will be described referring to FIG. 5.

(1) Location Registration Request (Binding Update Request)

When having moved from the subnetwork SY to the subnetwork SX, the mobile node MN obtains a CoA from the access router ARX as in the first embodiment (S301). Subsequently, the mobile node MN sends a binding update request to the server SBY having the home agent function for the mobile node MN (S302). More specifically, the mobile node MN sends the server SBY a location registration request packet having the IPv6 header in which the CoA (X:a) of the mobile node MN is set as a source address, the address of the server SBY is set as a destination address, and the URL of the mobile node MN (ohki@nec.com) is set as a destination option. Having received the location registration request, the server SBY updates its binding cache, and registers a combination of the notified CoA and URL of the mobile node MN therein (S303). After that, the server SBY sends a registration response (Binding ACK) to the mobile node MN (S304).

(2) Transmission/Reception of Packets

Previous to transmitting packets, the correspondent node CN sends an inquiry (DNS Query) for the CoA in association with the URL of the mobile node MN to the server SBX having the name server function of the subnetwork SX where it is staying (S401). Having received the DNS Query, the server SBX recognizes the network prefix Y of the home network SY of the mobile node MN based on the URL of the mobile node MN (S402). Since the network prefix Y differs from that of its subnetwork SX, the server SBX forwards the DNS Query to the server SBY in the subnetwork SY having the network prefix Y (S403). Incidentally, when the server SBX cannot find out the address of the server SBY in the home network of the mobile node MN, it retrieves the address from a root DNS, being not shown in the drawings, according to the general DNS architecture.

Upon receipt of the DNS Query from the server SBX, the server SBY recognizes the network prefix Y of the home network SY of the mobile node MN based on the URL of the mobile node MN (S404). Since the network prefix Y matches that of its subnetwork SY, the server SBY reads out its information on the binding (binding update information) between the URL and CoA of the mobile node MN (S405), and sends it back to the server SBX (S406). The server SBX notifies the correspondent node CN of the binding update information (S407).

When the correspondent node CN obtains the CoA of the mobile node MN, it sets the CoA as a destination address as in the usual packet transmission, and transmits packets (S408).

According to the third embodiment of the present invention, the system does not need to have the home agent and the name server separately as different nodes. Moreover, it is possible to reduce response time for the inquiry from the correspondent node CN.

Fourth Embodiment

Referring now to the drawings, a description will be made in detail of the fourth embodiment of the present invention. The fourth embodiment of the present invention differs from the first embodiment in that the home agent HA directly notifies the root name server of binding update information on receipt of a location registration request from the mobile node MN, and the root name server immediately notifies all name servers under the root name server about the binding update information. Accordingly, each name server holds/manages information on the binding (binding update information) between the home address and CoA of the mobile node MN as with the home agent HA.

Figure 6:
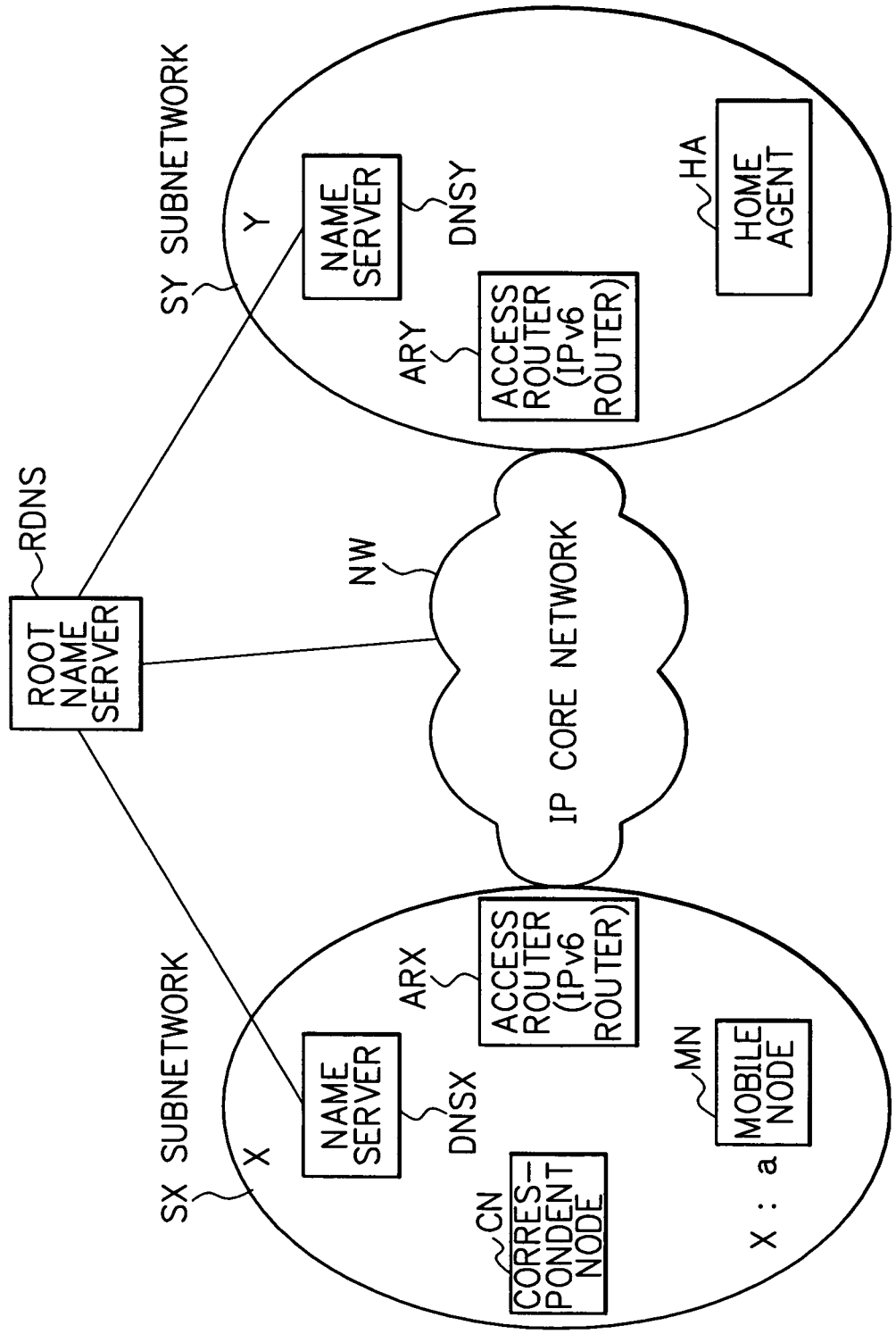
FIG. 6 is a diagram showing the configuration of a system according to the fourth embodiment of the present invention.
Figure 8:
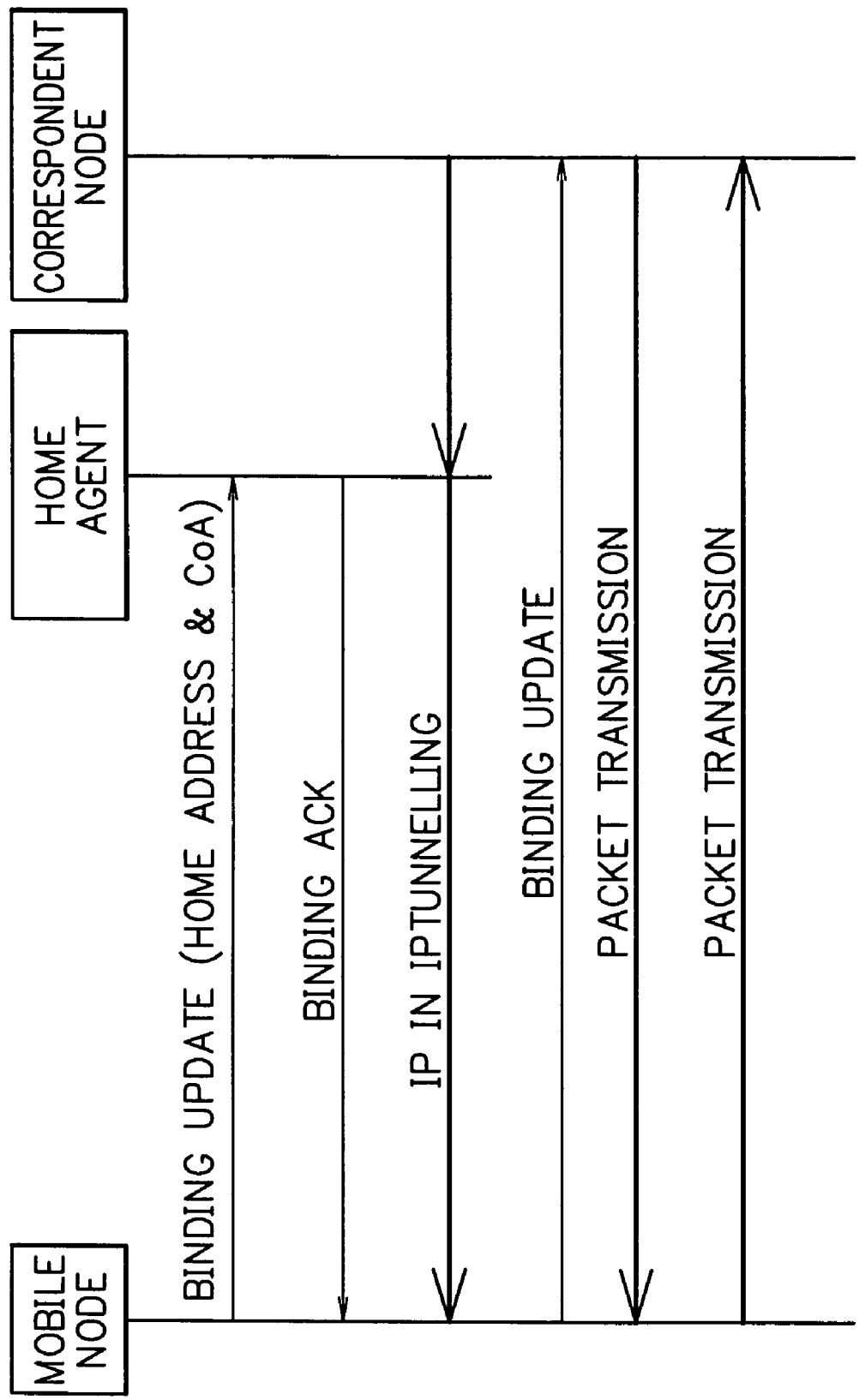
FIG. 8 is a sequence diagram showing the process for location registration and packet transmission from a correspondent node to a mobile node in IPv6.

FIG. 6 is a diagram showing the configuration of a system according to the fourth embodiment of the present invention. In FIG. 6, RDNS denotes the root name server, which is located at the highest level in a hierarchical name server system. The name servers DNSX and DNSY are located in a layer lower than where the root name server RDNS is located, and capable of communicating with the root name server RDNS. The root name server RDNS is also capable of communicating with the home agent HA of the mobile node MN. Such communications are exchanged through the IP core network NW. Incidentally, while there are shown two name servers DNSX and DNSY under the root name server RDNS in FIG. 6, three or more name servers may be connected to the root name server RDNS depending on the number of subnetworks. Besides, the name servers DNSX and DNSY set respectively in the subnetworks SX and SY are located in a layer just under the root name server RDNS, however, each of them may be located in a layer lower than a name server in another subnetwork.

FIG. 7 is a sequence diagram showing the operation of the system according to the fourth embodiment of the present invention. In the following, the operation of the system of this embodiment, mainly about its differences with that of the first embodiment, will be described referring to FIGS. 6 and 7.

(1) Location Registration Request (Binding Update Request)

When the mobile node MN has moved from one subnetwork to another, the mobile node MN sends a binding update request to the home agent HA, and, in response to the request, the home agent HA updates its binding cache and sends a registration response (Binding ACK) to the mobile node MN as in the first embodiment (S501 to S504). Immediately after updating the CoA of the mobile node MN in the binding cache, the home agent HA sends a binding update request including this binding update information to the root name server RDNS (S505).

The root name server RDNS updates its information on the binding between the URL and CoA of the mobile node MN based on the binding update information (S506), and immediately notifies all name servers DNSX and DNSY under the root name server RDNS of the binding update information (S507). The respective name servers DNSX and DNSY update information on the binding between the URL and CoA of the mobile node MN based on the binding update information (S508, S509). When there are other name servers under the name servers DNSX and DNSY, the name servers DNSX and DNSY immediately send the name servers the binding update information.

(2) Transmission/Reception of Packets

When the correspondent node CN sends packets to the mobile node MN, the correspondent node CN previously sends an inquiry for the CoA in association with the URL of the mobile node MN to the name server DNSX in the subnetwork SX where it is staying as in the first embodiment (S601). In this embodiment, the binding update information of the mobile node MN is reported to the respective name servers DNSX and DNSY through the home agent HA synchronized with the movement of the mobile node MN and root name server RDNS. Consequently, the name server DNSX reads out its information on the binding (binding update information) between the URL and CoA of the mobile node MN (S602), and notifies the correspondent node CN of the information (S603). The correspondent node CN obtains the CoA of the mobile node MN making use of the information, and transmits packets (S604).

According to the fourth embodiment of the present invention, the correspondent node CN can obtain the CoA of the mobile node MN directly from the name server in the subnetwork where it is visiting. Thus, it is possible to reduce response time for the inquiry from the correspondent node CN drastically.

Incidentally, in the above description, the home agent HA sends binding update information to the root name server RDNS only when the mobile node MN makes a location registration. However, in the case where the root name server RDNS, and the name servers DNSX and DNSY each conduct an expiration check on their binding update information with a timer and remove the information when a certain period of time has passed since the information was updated, the home agent HA may deliver binding update information to the root name server RDNS regularly at intervals shorter than the certain period of time in addition to the occasion of mobile node MN's location registration, and the root name server RDNS may deliver the information to the name servers DNSX and DNSY.

Fifth Embodiment

[Configuration]

A mobile node managing system according to the fifth embodiment of the present invention comprises:

Access Router (AR)

An IPv6 router having a 1-hop relationship with the mobile node MN serves as an access router, and is provided with surrogate HA (local HA) and surrogate MN (or surrogate CN) functions. Namely, the access router includes a means for receiving a registration request from the mobile node MN on behalf of the home agent HA, and a means for maintaining and updating binding update information on behalf of the mobile node MN (or correspondent nodes CN). Besides, the access router includes a means for adding the binding update information of the mobile node MN to a registration response (Binding ACK) to the mobile node MN, and transmitting it to the access router (new AR) in the subnetwork where the mobile node MN moved. That is, when the registration request (BU) from the mobile node MN has been sent to the access router (previous AR) via the new AR, the previous AR adds the binding update information of the mobile node MN to a registration response to the mobile node MN, and transmits it to the new AR. In addition, the access router includes a means for taking over the surrogate HA and surrogate MN functions from the previous AR. Namely, triggered by the receipt of the registration response with the binding update information, the new AR takes over the surrogate HA and surrogate MN functions for the mobile node MN from the previous AR. More specifically, the access router is provided with a node management table as a concrete means for supporting the surrogate HA function and a binding update table for supporting the surrogate MN (CN) function.

Mobile Node (MN)

As with the conventional Mobile IPv6 mobile node, the mobile node MN has a means for obtaining a CoA, and sending a registration request to the surrogate home agent HA.

[Operation]

A mobile node managing system according to the fifth embodiment of the present invention operates as follows:

(1) Registration Request (Surrogate HA Function)

When having moved from one subnetwork to another, the mobile node MN recognizes the move to another subnetwork through a router advertisement as with the conventional Mobile IPv6 mobile node, and sends a registration request to the surrogate HA (previous AR) before it moved. The registration request is sent to the previous AR via the new AR in the first fop from the mobile node MN in the visited subnetwork. Having received the registration request, the previous AR checks that the mobile node MN was staying its own area just before it moved by the node management table, and authenticates the mobile node MN according to the SA (Security Association) with the mobile node MN. When the mobile node MN is authenticated, the previous AR sends a registration response (Binding ACK) to the new AR in behalf of the home agent HA.

The new AR takes over the surrogate HA function for the mobile node MN from the previous AR triggered by the registration response. The registration response includes the binding update table for the mobile node MN maintained by the previous AR. When receiving the registration response from the previous AR, the new AR forwards it to the mobile node MN.

(2) Registration Request (Surrogate MN Function)

Subsequently, the new AR referrers to the binding update table of the mobile node MN, and sends a Binding Update to correspondent nodes (CN) of the mobile node MN on behalf of the mobile node MN. When the last hop router (AR) that serves each correspondent node CN receives the Binding Update, the router AR updates the binding update table for the correspondent node CN on behalf of the node CN.

(3) Transmission/Reception of Packets

When the mobile node MN transmits packets to a correspondent node CN, the header of each packet can be set so that SA (Source Address)=CoA and DA (Destination Address)=the NAI (Network Access Identifier) or URI (Uniform Resource Identifier) of the correspondent node CN. The surrogate HA (access router AR) of the mobile node MN discovers the latest address of the correspondent node CN from the binding update table of the mobile node MN, and sets the CoA of the correspondent node CN as a DA (DA=CoA of the correspondent node CN) to forward packets. The packets are delivered to the correspondent node CN via the surrogate HA (access router AR) of the correspondent node CN.

PRACTICAL EXAMPLE

1. Description of the Configuration

Figure 9:
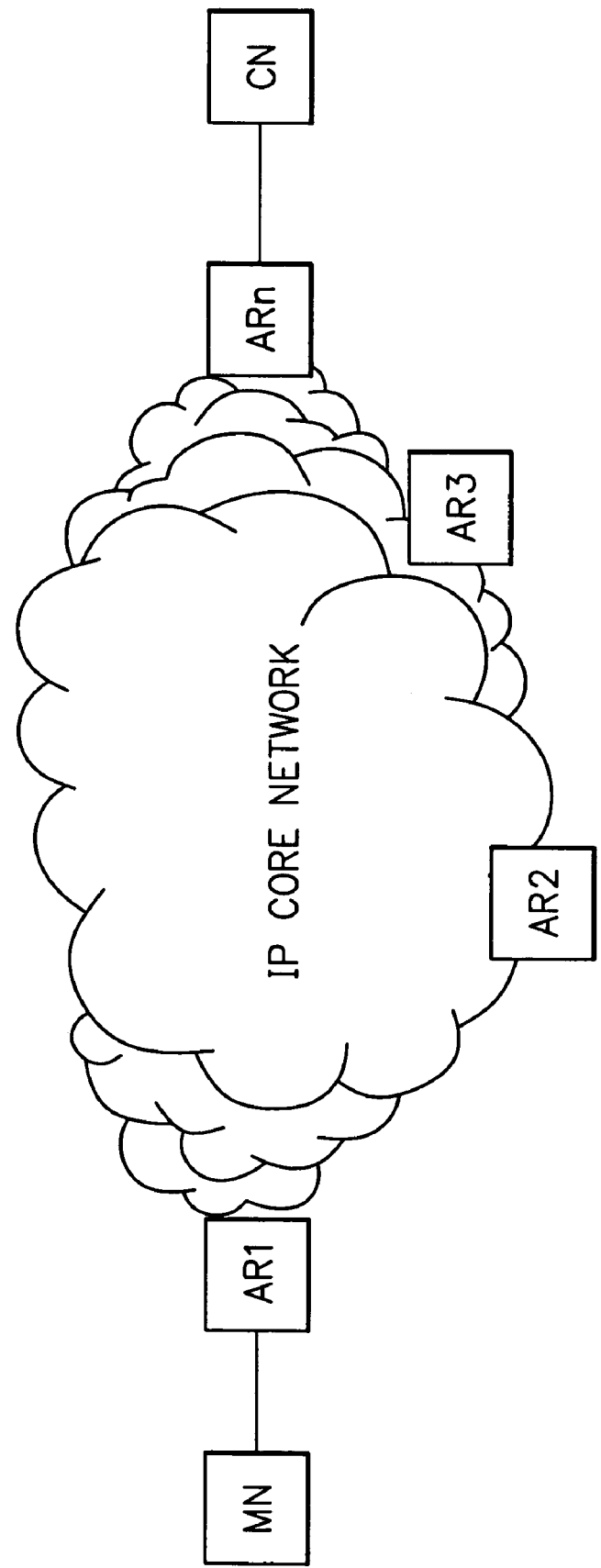
FIG. 9 is a diagram showing the configuration of a system according to the fifth embodiment of the present invention.

FIG. 9 is a diagram showing the configuration of a system according to the fifth embodiment of the present invention. As can be seen in FIG. 9, a mobile node managing system of this embodiment comprises a mobile node MN, access routers AR (AR1 to ARn), a correspondent node CN and an IP core network such as the Internet for interconnecting the access routers AR. The access routers are IP (access) routers having a 1-hop relationship with the mobile node MN, and are provided with a node movement managing function as a surrogate for the home agent HA as well as a movement managing function as a surrogate for the mobile node MN (correspondent node CN). If the configuration shown in FIG. 9 is applied to the 3G mobile network, the relationship between the access routers AR and the mobile node MN corresponds to that of a GGSN (Gateway GPRS Support Node) and a mobile node, or that of a PDSN and a mobile node in the cdma 2000 system. Besides, in the Open LAN architecture which has already come under review in MWIF, it is conceivable that the RNC or Node B will have the function of an IP router in the future. If the configuration shown in FIG. 9 is applied to the architecture, the relationship between the access routers AR and the mobile node MN corresponds to that of the RNC or Node B and a mobile node.

Figure 10:
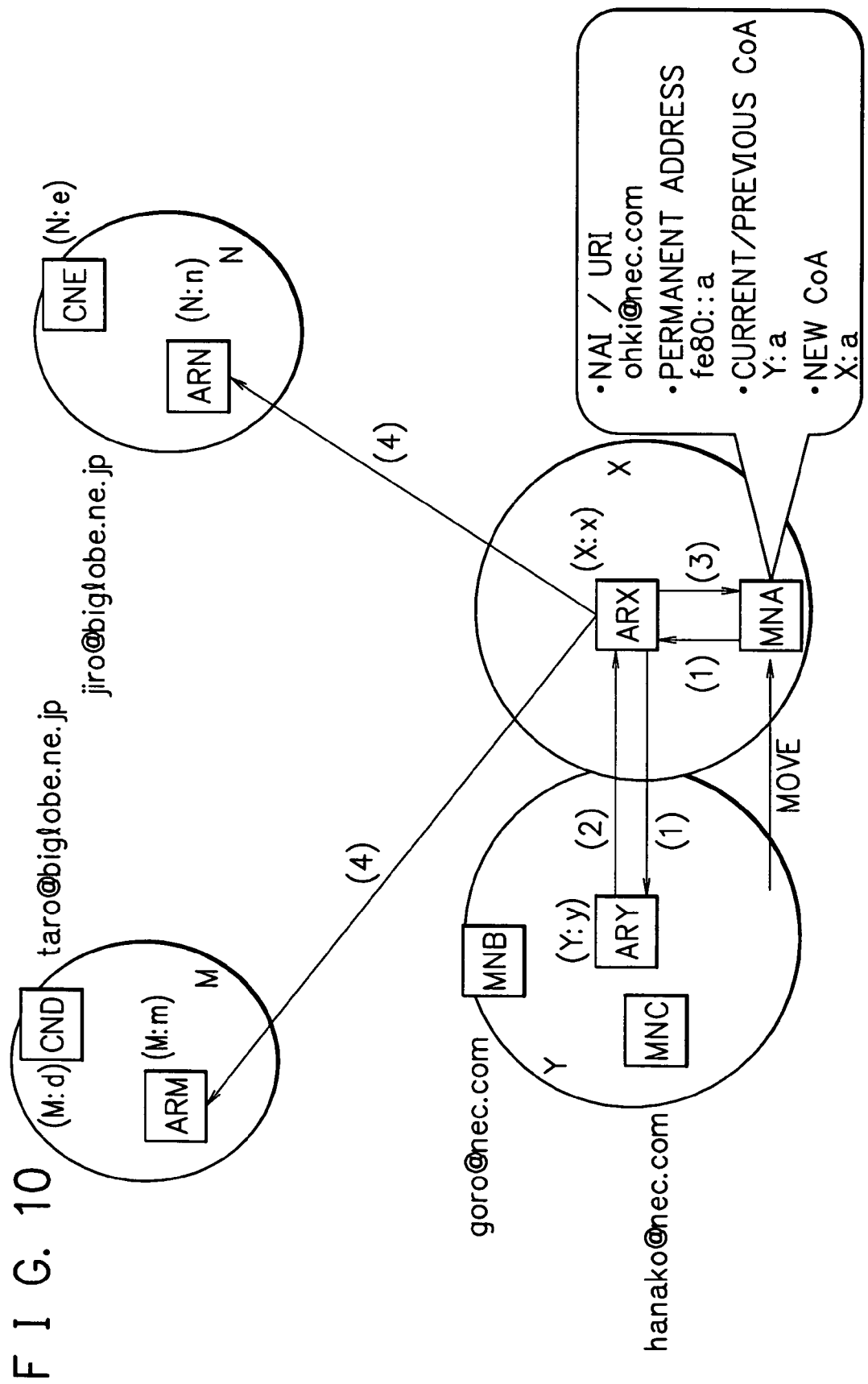
FIG. 10 is a sequence diagram showing the process for transmitting a registration request or a Binding Update for a mobile node according to the fifth embodiment of the present invention.

FIG. 10 is a sequence diagram showing the process for transmitting a registration request (Binding Update) from a mobile node MN according to the fifth embodiment of the present invention. As shown in FIG. 10, a mobile network is comprised of subnetworks SM, SN, SX and SY each having a different network prefix. Each of the subnetworks SM, SN, SX and SY is provided with one access router. Mobile nodes access a mobile network via the access routers to enjoy network service or communicate with other nodes. FIG. 10 shows as examples four subnetworks SM, SN, SX and SY, which have network prefixes M, N, X and Y, respectively. Additionally, in FIG. 10, the subnetworks SM, SN, SX and SY include the access routers ARM, ARN, ARX and ARY, respectively, and mobile nodes CND, CNE, MNA, MNB and MNC are staying in the respective subnetworks. The sequence diagram of FIG. 10 illustrates the process for transmitting a registration request in the case where the mobile node MNA has moved from the subnetwork SY to the subnetwork SX.

Figure 11:
FIG. 11 is a diagram showing the configuration of node management tables and a binding update table of an access router having surrogate HA and surrogate MN (or surrogate CN) functions. Table (1) is a node management table representing the surrogate HA function of the access router. Table (2) is a binding update table for a mobile node MNA managed by the access router ARY, representing a surrogate node function (when the MNA moves from the subnet Y to X, information in this table is sent from the ARY to ARX). Table (3) is a node management table (after the MNA has moved to another area).

FIG. 11 is a diagram showing the configurations of node movement management functions of the access router AR having surrogate HA and surrogate MN (or surrogate CN) functions. In FIG. 11, tables (1) and (3) are node management tables representing surrogate HA functions of the access router AR. Table (2) is a binding update table representing a surrogate node function of the access router AR. Table (1) in FIG. 11 is a node management table of the access router ARY in the subnetwork SY where the mobile node MNA was staying just before it moved. Table (2) is the binding update table for the mobile node MNA. Table (3) is a node management table of the access router ARY after the mobile node MNA has moved to another subnetwork SX. As can be seen in FIG. 11 (1) and (2), the binding update table for each mobile node is related with the relevant node in the node management table by a pointer. When the mobile node moves from one subnetwork to another, the access router (new AR) in visited the subnetwork takes up the surrogate HA function. In other words, the new AR takes over the binding update table for the mobile node from the previous AR.

Figure 12:
FIG. 12 is a diagram showing the configuration of a node management table and binding update tables of an access router having surrogate HA and surrogate MN (or surrogate CN) functions. Table (1) is a node management table. Table (2) is a binding update table for a mobile node CNE managed by the access router ARN. Table (3) is a binding update table for the CNE managed by the ARN (after the MNA has moved from the subnet Y to X).

FIG. 12 is a diagram showing the configuration of a node management table and binding update tables. In FIG. 12, table (1) is a node management table of the access router ARN depicted in FIG. 10. Tables (2) and (3) shows examples of the configurations of the binding update tables for the mobile node CNE before and after the MNA, which is a correspondent node of the node CNE, has moved from one subnetwork to another.

In the binding update tables of the mobile nodes MNA and CNE, a combination of the NAI or URI and CoA of each correspondent node is registered. One approach to the initial generation of such binding update table involves each user's making a list of combinations of the NAIs or URIs and CoAs of all correspondent nodes, and registering it as a binding update table with the access router in the visited subnetwork. It is also possible to notify the access router of a list of only NAIs or URIs of correspondent nodes with the sections of CoAs left blank. In this case, although the fields of CoAs are left blank in the initial binding update table generated by the access router, the latest CoAs are sequentially written to the table every time respective correspondent nodes make registration requests as described later, and when once all the correspondent nodes have made registration requests, the contents of the binding update table are filled.

Figure 13:
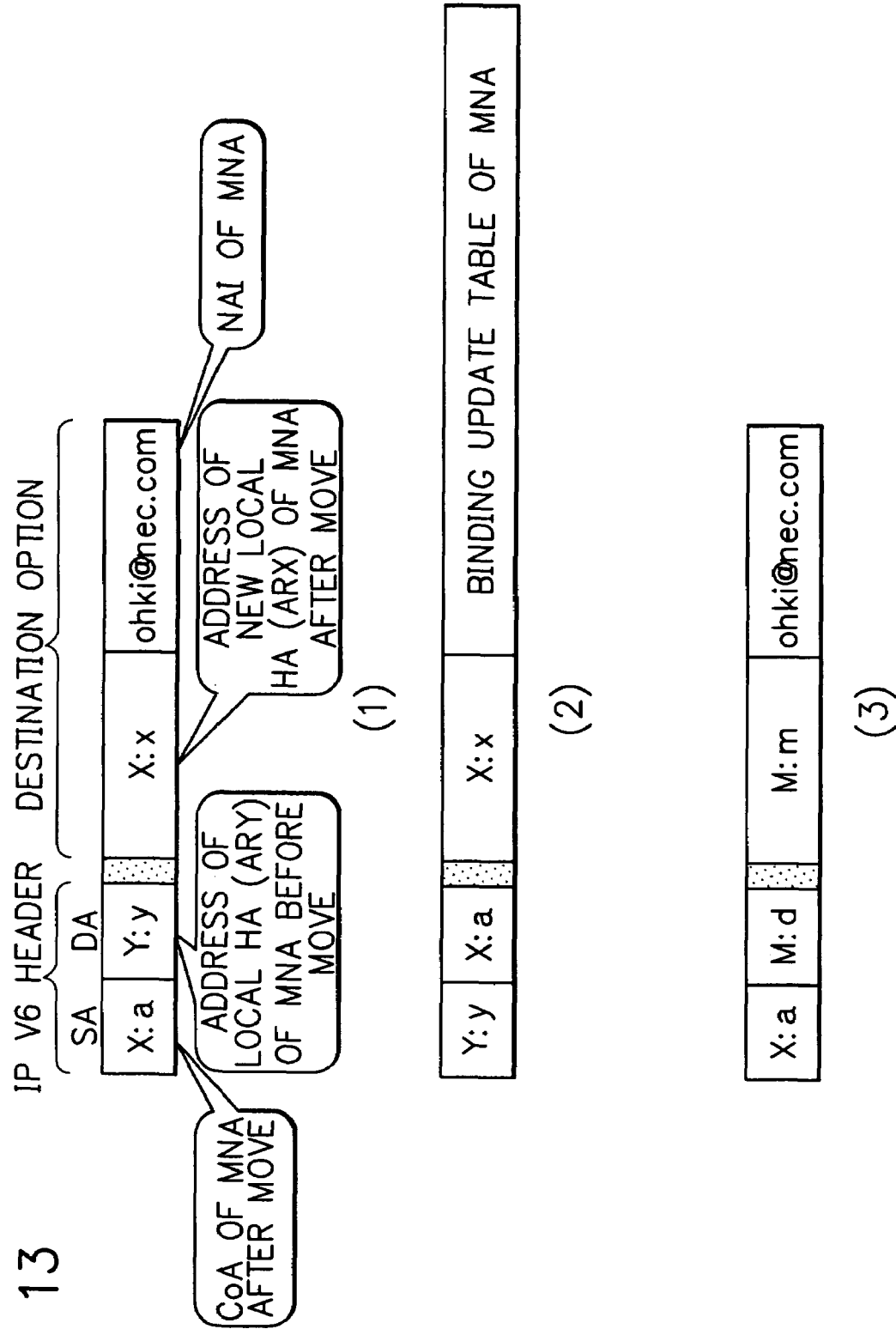
FIG. 13 is a diagram showing examples of the formats of registration request packets sent from a mobile node to a surrogate HA. Packet format (1) is of a registration request (Binding Update) sent from a mobile node MNA to an old surrogate HA (ARY) after it has moved. Packet format (2) is of a registration acknowledgement (Binding ACK). Packet format (3) is of a Binding Update sent by a new surrogate HA of the MNA in behalf of the MNA.

FIG. 13 is a diagram showing examples of the packet formats. FIG. 13 (1) is the format of a registration request (BU) packet sent by the mobile node MNA when it has moved to another subnetwork to the access router ARY which served as a surrogate HA in the subnetwork where the node MNA was staying. Packet format (2) is of a registration response (Binding ACK) in response to a registration request from the mobile node MNA. Packet format (3) is of a registration request. (BU) sent by the access router ARX, being a new surrogate HA of the mobile node MNA, in behalf of the node MNA.

Figure 14:
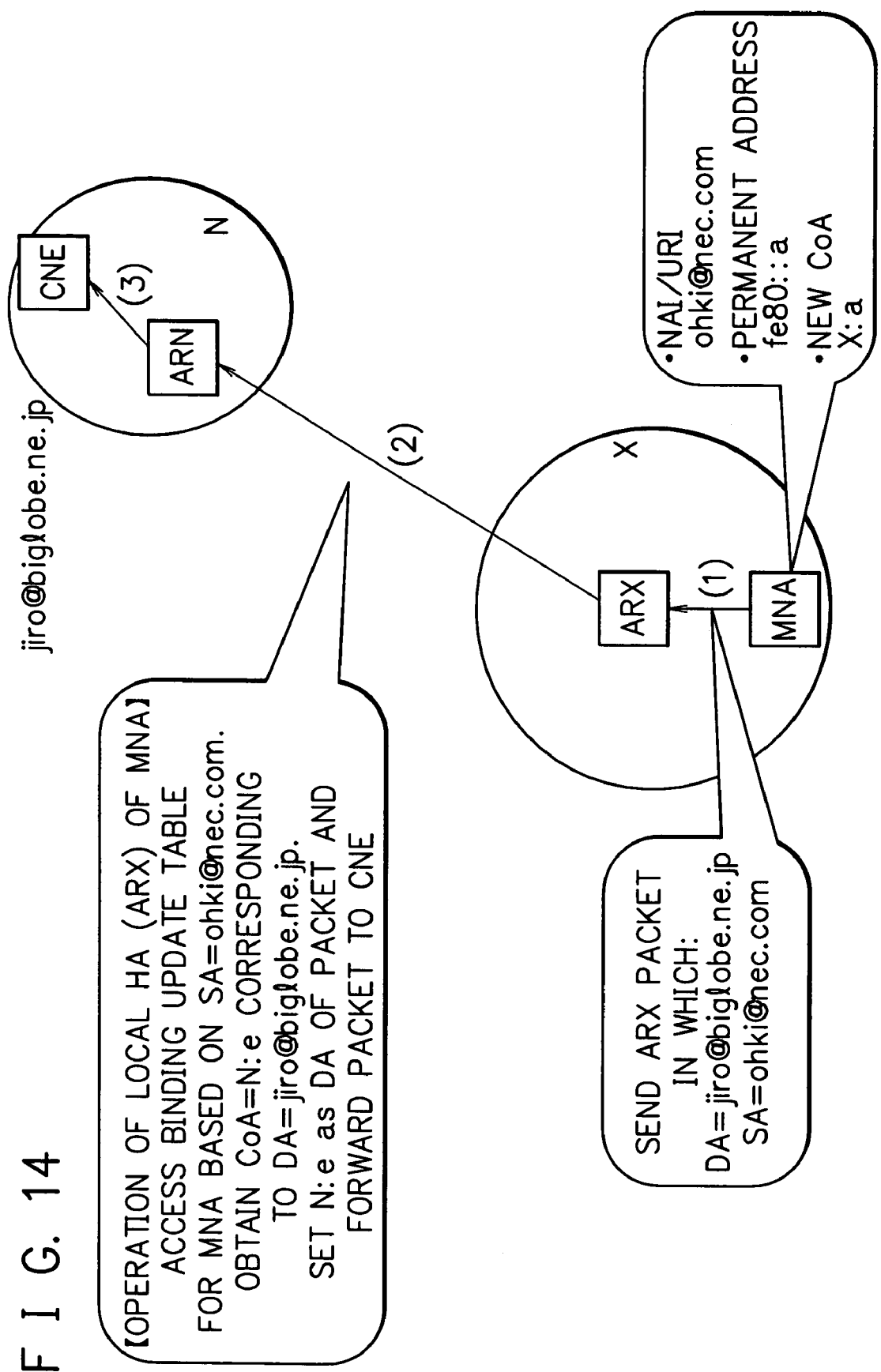
FIG. 14 is a sequence diagram showing the process for packet transmission from a mobile node to a correspondent node.

FIG. 14 is a sequence diagram showing the process for packet transmission from a mobile node to a correspondent node. FIG. 14 illustrates the case where the mobile node MNA transmits packets to the correspondent node CNE.

Figure 15:
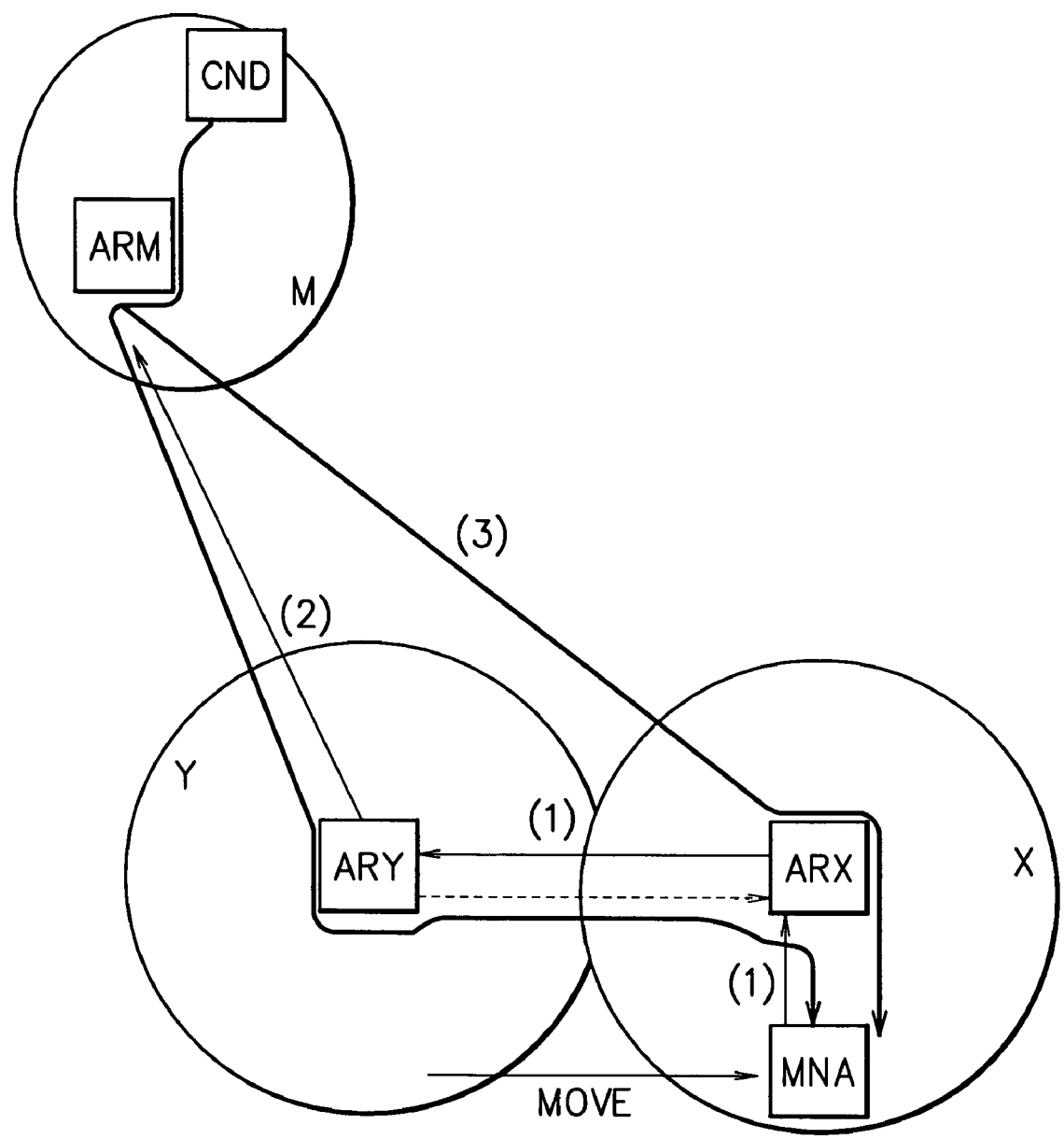
FIG. 15 is a sequence diagram showing process of a handoff according to the fifth embodiment of the present invention.

FIG. 15 is a sequence diagram showing the process of a handoff. FIG. 15 illustrates the process of a handoff when the mobile node MNA moves from the subnetwork SY to the subnetwork SX during communication.

Figure 16:
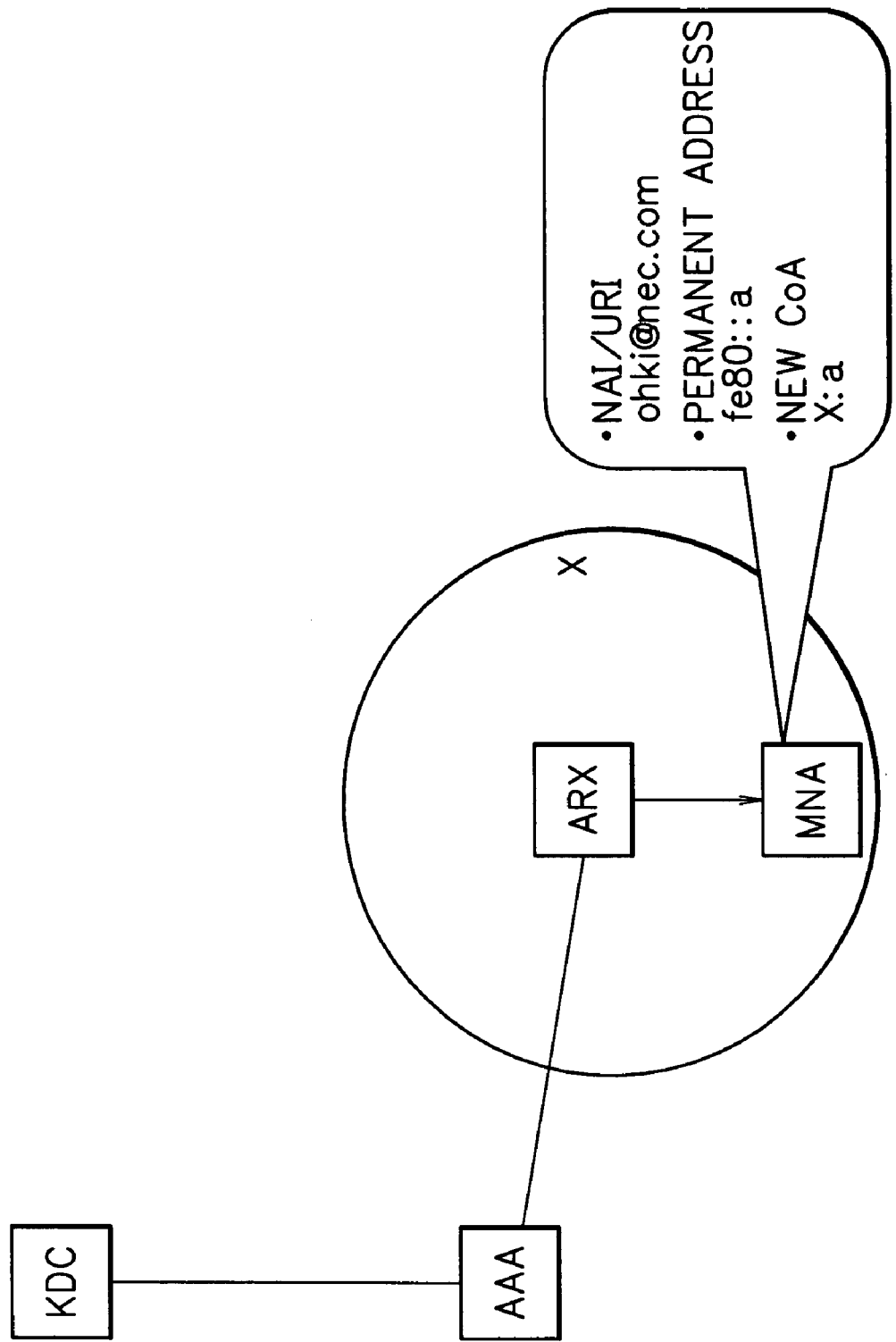
FIG. 16 is a diagram showing an example of coordination with an AAA server according to the fifth embodiment of the present invention.
Figure 18:
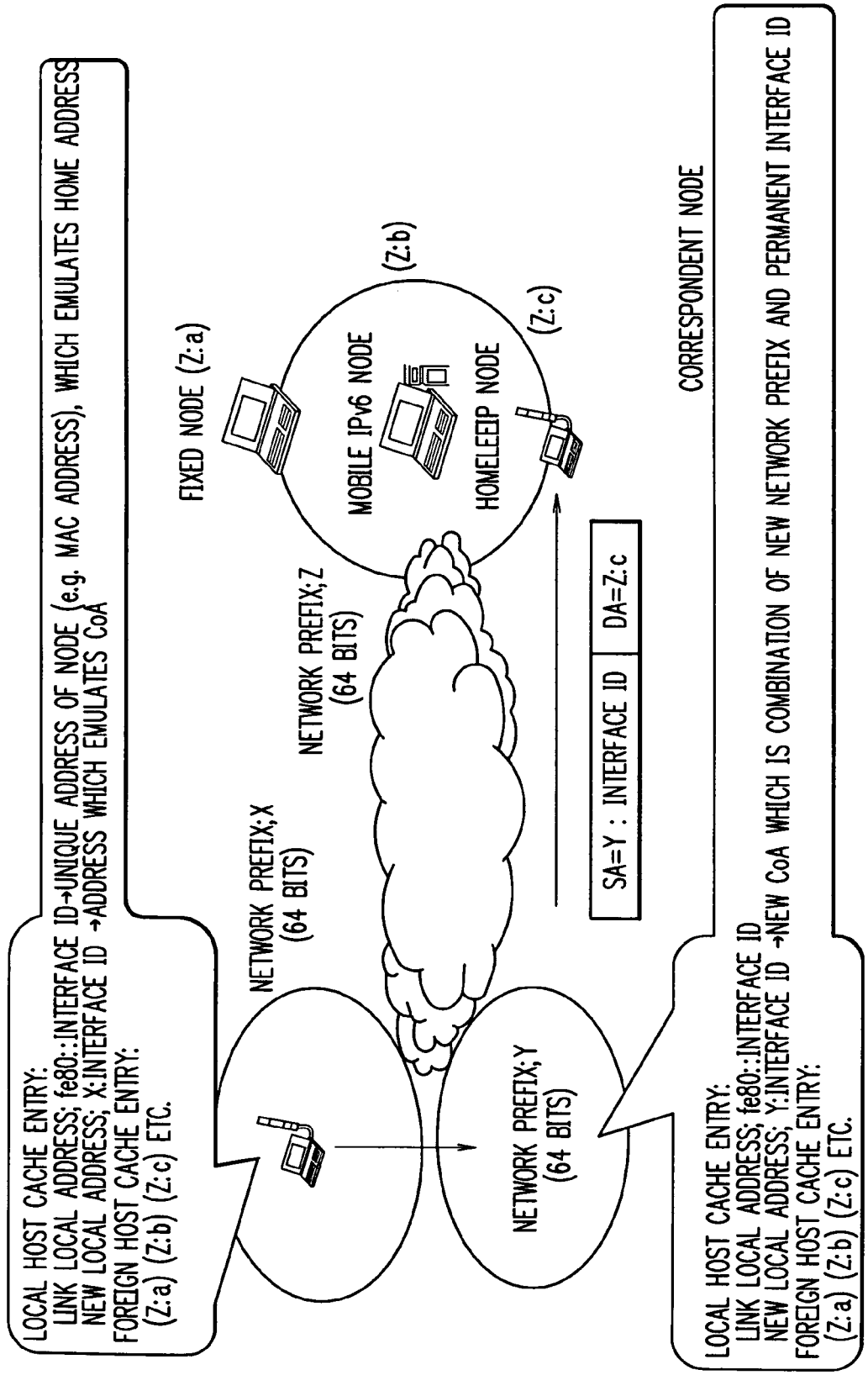
FIG. 18 is a diagram showing another example of the prior art.

FIG. 16 is a diagram showing an example of coordination with an AAA (Authentication Authorization Accounting) server according to the fifth embodiment of the present invention.

2. Description of the Operation

In the following, a description will be given of the operation of the system according to the fifth embodiment of the present invention in reference to the drawings.

(1) Registration Request: Binding Update (Surrogate HA Function)

FIG. 10 is a sequence diagram showing the process for transmitting a registration request or a Binding Update according to the fifth embodiment of the present invention. FIG. 10 illustrates the process for transmitting a registration request when the mobile node MNA moves from the subnetwork SY to the subnetwork SX.

When having moved from the subnetwork SY to the subnetwork SX, the mobile node MNA recognizes the move to another subnetwork through a router advertisement as with the conventional Mobile IPv6 mobile node. In FIG. 10, the access router ARX, which is an IPv6 router, provides the router advertisement. When the mobile node MNA recognizes the move, it obtains a CoA as with a conventional mobile node. The CoA may be obtained by the stateful address auto configuration or the stateless address auto configuration according to DHCP (Dynamic Host Configuration Protocol) v6 (RFC 1971). In FIG. 10, X:a designates a new CoA obtained by the mobile node MNA. X:a is an IPv6 address of 128 bits in length, in which X indicates the network prefix of the subnetwork SX and a indicates the interface ID of the mobile node MNA.

Subsequently, the mobile node MNA sends a registration request (Binding Update) to the access router ARY, which was the surrogate HA (previous AR) before the node MNA moved. The mobile node MNA sets its CoA (X:a) as a source address (source address SA in the IPv6 header) and the address (Y:y) of the access router ARY as a destination address (destination address DA in the IPv6 header) for the registration request packet. In addition, the mobile node MNA specifies the route of the registration request using the destination option header of Mobile IPv6 (or routing extension header of IPv6). Here, the access router ARX is specified as a relay node, and the address (X:x) of the access router ARX is set as a destination option. With this, the registration request of the mobile node MNA is transmitted to the previous access router ARY via the new access router ARX located 1-hop distant from the mobile node MNA (FIG. 10 (1)). On the other hand, the NAI (RFC: Network Access Identifier) or the SIP URI of the mobile node MNA may be set in the destination option header of IPv6 so that a user can use an address in the same format as a mail address or a user of a SIP (Session Initiation Protocol) node can use a SIP address (URI) when transmitting packets. In this example, ohki@nec.com is used as the NAI of the mobile node MNA.

Having received the registration request, the access router ARX adds the NAI and CoA of the mobile node MNA to the node management table since its own address is specified as the address of the relay node, and forwards the registration request packet to the access router ARY.

When the access router ARY receives the registration request, it learns the new CoA of the mobile node which made the registration request from the source address (SA) of the registration request. The access router ARY also learns the NAI (or SIP URI) from the destination option header of Mobile IPv6. The access router ARY searches the node management table that realizes the surrogate HA function based on the NAI and CoA. FIG. 11 (1) shows an example of the configuration of the node management table of the access router ARY. Referring to FIG. 11 (1), the node management table includes a set of the NAI (or SIP URI), CoA and SA (Security Association; an authentication algorithm and an authentication key between each node and the access router ARY) of each node to be managed. FIG. 11 (1) shows the node management table before the mobile node MNA moves to the subnetwork SX, in which the CoA in association with the NAI of the mobile node MNA, ohki@nec.com is Y:a (CoA=Y:a). As a result of the search of the node management table, the access router ARY determines that the mobile node MNA was visiting its subnetwork SY just before it moved since Y:a is set as the CoA of the mobile node MNA, and authenticates the mobile node MNA according to the SA (Security Association) with the mobile node MNA. The registration request from the mobile node MNA includes, for example, a response value (onetime password) corresponding to a challenge value obtained from the router advertisement given by the previous surrogate HA (ARY) as measures against "replay attack", and thereby the access router ARY can authenticate the mobile node MNA. When the mobile node MNA is authenticated, the previous ARY replaces the CoA of the mobile node MNA with X:a, and sends a registration response (Binding ACK) to the mobile node MNA via the new access router ARX in behalf of the home agent HA (FIG. 10 (2), (3)). FIG. 11 (3) shows the node management table after the access router ARY has replaced the CoA of the mobile node MNA with X:a. When the access router ARY sends a registration response to the mobile node MNA, the router ARY sets its address (Y:y) as a source address (SA) and the CoA (X:a) of the mobile node MNA as a destination address (DA) of the registration response packet as shown in FIG. 13 (2). The access router ARY also sets the address (X:x) of the access router ARX, which is a new surrogate HA of the mobile node MNA, in the destination option header of Mobile IPv6 as an address of a relay node. In addition, the access router ARY writes its binding update table information of the mobile node MNA to a packet payload, and transmits the packet.

Having received the registration response packet, the access router ARX recognizes by the identifier of the packet that the packet is of registration response, and that its final destination is the mobile node MNA which made a registration request in response to the router advertisement from the access router ARX. Further, the access router ARX becomes aware that its own address is set in the destination option header of Mobile IPv6. Thus, the access router ARX acknowledges taking over the surrogate HA function from the access router ARY.

When receiving the registration response from the access router ARY (previous AR), the access router ARX (new AR) reads the binding update table information of the mobile node NIA out of the packet payload. Subsequently, the access router ARX sets a pointer to the field of the mobile node MNA in its own mobile node management table, and writes the read binding update table information of the mobile node NIA to a field in the binding update table indicated by the pointer. After that, the access router ARX forwards the registration response to the mobile node MNA (FIG. 10 (3)).

Herewith, the access router ARX takes over the surrogate HA function and surrogate MN function for the mobile node MNA from the access router ARY.

Incidentally, when the mobile node NIA is an unauthorized node, the registration request from the mobile node MNA is refused by the authentication conducted by the access router ARY. Then the access router ARY sends back the NAC to the access router ARX. When the access router ARX receives the NAC, it removes the NAI and CoA of the mobile node NIA written to the node management table.

Next, a description will be given of the surrogate MN function of the access router.

(2) Registration Request (Surrogate MN Function)

The access router ARX (new AR), which has taken up the surrogate MN function for the mobile node MNA, and sends Binding Updates to all correspondent nodes (CN) of the mobile node MNA on behalf of the mobile node MNA (FIG. 10 (4)). FIG. 13 (3) shows a binding update packet sent from the access router ARX to the correspondent node CND including examples of addresses. As can be seen in FIG. 13, the CoA (X:a) of the mobile node MNA is set as a source address SA, the CoA (M:d) of the correspondent node CND is set as a destination address DA, and the address (M:m) of the access router ARM and the NAI of the mobile node MNA are set as destination options.

When the last hop access router (AR) for each correspondent node CN receives the Binding Update from the access router ARX, the router AR updates the binding update table for the node CN on behalf of the node CN. That is, the access router AR replaces an old CoA associated with the same NAI as that reported by the binding update packet with a newly reported CoA. In an example of FIG. 12, the CoA of the mobile node MNA (Y:a) in the binding update table of the mobile node CNE (FIG. 12 (2)) is replaced by X:a (FIG. 12 (3)) when the access router ARM representing the surrogate HA in the subnetwork where the correspondent node CND of the mobile node MNA is visiting receives the Binding Update from the mobile node MNA on behalf of the correspondent node CND.

Next, a description will be given of the surrogate HA function of the access router for the mobile node.

(3) Transmission/Reception of Packets

FIG. 14 is a sequence diagram showing a process for packet transmission from the mobile node MNA to a correspondent node. More specifically, FIG. 14 illustrates the case where the mobile node MNA transmits packets to the correspondent node CNE by way of example. When the mobile node MNA transmits packets to the access router ARX, ohki@nec.com is set as a source address SA (SA=ohki@nec.com) and jiro@biglobe.ne.jp is set as a destination address (DA=jiro@biglobe.nejp) (FIG. 14 (1)). When the access router ARX receives packets from the mobile node MNA, and forwards the packets to a correspondent node, the access router ARX operates as follows. First, the access router ARX recognizes that the packets are sent from the mobile node MNA by the source address SA of the packets. Subsequently, the access router ARX obtains the CoA (X:a) of the mobile node MNA from the node management table, and sets the CoA (X:a) as a source address SA of the packets to be forwarded. After that, the access router ARX referrers to the binding update table of the mobile node MNA, and sets the CoA (N:e) of the correspondent node CNE associated with the DA=jiro@biglobe.nejp as a destination address DA of the packets to be forwarded.

The packets addressed to the correspondent node CNE are delivered to the access router ARN (a surrogate for the correspondent node CNE) in the subnetwork SN having the network prefix N in the CoA set as a destination address DA through the ordinary IP routing. The access router ARN recognizes that the packets are addressed to the correspondent node CNE based on the destination address DA, and replaces the destination address DA with the NAI of the node CNE to thereby forward the packets to the node CNE.

As is describes above, since the CoA of the correspondent node CNE can be designated as a destination address DA of the packets sent to the correspondent node CNE, the access routers ARX and ARN are not required to encapsulate/decapsulate the packets.

(4) Handoff

FIG. 15 illustrates the process of a handoff when the mobile node MNA moves from one subnetwork to another while receiving packets from the correspondent node CND by way of example.

When the mobile node MNA moves to another subnetwork, it detects the move, and obtains a CoA in the same manner as described previously for (1) Registration Request. Subsequently, the mobile node MNA sends a registration request to the access router ARY via the access router ARX (FIG. 15 (1)). The access router ARX registers a combination of the NAI and CoA of the mobile node MNA in the node management table as mentioned above.

Having received the registration request from the mobile node MNA that is having a packet communication, the access router ARY recognizes that the mobile node MNA has moved to another subnetwork. Accordingly, the access router ARY serves as an anchor for the mobile node MNA, and starts forwarding packets to the mobile node MNA, In this case, the access router ARX does not take over the surrogate HA function for the mobile node MNA until the packet transmission from the correspondent CND is completed or a certain period of time has passed by a timer, and the access router ARY carries on the packet transmission as an anchor until it is finished. To be more precise, the access routers perform operations as follows.

When the access router ARY receives a registration request from the mobile node MNA, it authenticates the mobile node MNA in the same manner as described previously for (1) Registration Request. If the mobile node MNA is authenticated, the access router ARY sends a Binding Update to the correspondent node CND in behalf of the mobile node MNA (FIG. 15 (2)). In addition, the access router ARY replaces the CoA of the mobile node MNA in the node management table with a new CoA so that packets sent from the correspondent node CND to the mobile node MNA are forwarded to the access router ARX according to the network prefix X in the new CoA. Having received the Binding Update of the mobile node MNA from the access router ARY, the access router ARM changes the CoA of the mobile node MNA in the binding update table for the correspondent node CND. After that, the access router ARM sends packets from the correspondent node CND to the mobile node MNA to the new CoA of the mobile node MNA as well as sending them to the access router ARY (FIG. 15 (3)). The access router ARY replaces the network prefix Y with X in the destination address DA of the received packets to forward them to the access router ARX. The Access router ARX forwards the packets to the mobile node MNA. As a result, the packets addressed to the mobile node MNA undergo so-called bicasting, which minimizes packet losses involved in handoffs.

When the correspondent node CND has finished transmitting packets to the mobile node MNA, the access router ARX takes over the surrogate HA function and surrogate MN function for the mobile node MNA from the access router ARY in the same manner as described previously for (1) Registration Request.

(5) Node Authentication (Security)

In this embodiment, the coordination between Mobile IP and AAA (Authentication Authorization Accounting) server is available as in the conventional techniques. FIG. 16 is a diagram illustrating an example of the operation to authenticate a node. In the model of FIG. 16, when receiving a registration request from the mobile node MNA, the access router ARX being the surrogate HA authenticates the node in coordination with an AAA server. Incidentally, the KDC (Key Distribution Center) depicted in FIG. 16 is provided with a function for delivering authentication keys to the AAA server and the mobile node MNA.

As described above, if only a mobile node can obtain its own CoA, its surrogate (local) home agent maintains and updates the binding update information for the mobile node afterwards. Therefore, the mobile node does not have to update the binding update information when it is in a stand-by mode. Thus, it is possible to improve the battery consumption due to the update and management of the binding update information seen in a conventional system.

In addition, Binding Updates from mobile nodes are exchanged by access routers, which prevents the flow of binding update traffic in the radio sections.

Furthermore, as long as the binding update table of an access router contains information on a correspondent node, there is no need to tunnel outgoing packets to the correspondent node. Thus, it is possible to avoid the problem of scalability involved in the encapsulation/de-capsulation of packets by the access router.

INDUSTRIAL APPLICABLITY

As set forth hereinabove, in accordance with the present invention, it is possible to achieve the following effects.

Since an correspondent node of a mobile node can be aware of the CoA of the mobile node by sending an inquiry to the nearest name server, the first packet addressed to the mobile node can be transmitted directly from the correspondent node.

Besides, a mobile node is only required to send a binding update request to its home agent, and each correspondent node of the mobile node need only send an inquiry as to the CoA of the mobile node as appropriate. Consequently, it is possible to improve the battery consumption of mobile nodes seen in a system where each mobile node has to send its CoA to plural correspondent nodes. Additionally, the flow of many binding update requests exchanged between nodes can be avoided in radio sections.

Moreover, a home agent is basically required only to send back relevant binding update information in response to a DNS Query, and encapsulation is unnecessary for packets.

The invention claimed is:

1. A mobile node management system comprising a plurality of subnetworks interconnected with each other in a mobile network which offers a packet communication service for mobile nodes each visiting an arbitrary subnetwork, wherein:

at least one of the subnetworks includes an access router having a one-hop relationship with at least one of the mobile nodes, the access router is provided with a node management table for holding a care-of-address of the at least one mobile node in a domain of the access router, a binding update table for holding a care-of-address of each correspondent node of the at least one mobile node in the domain, and a home agent surrogate means for receiving packets sent from the at least one mobile node in the domain to a correspondent node to forward the packets to the correspondent node after replacing their destination address with the care-of-address of the correspondent node and receiving packets sent to the at least one mobile node in the domain to forward the packets to the at least one mobile node, the node management table has a configuration to maintain a combination of a Network Address Identifier (NAI) or Uniform Resource Identifier (URI) and care-of-address of said at least one mobile node in the domain of the access router, the binding update table has a configuration to maintain a combination of the NAI or URI and care-of-address of each correspondent node, and the NAJ or URI of the correspondent node is set as a destination address of the packets sent from the mobile node to the correspondent node.

2. The mobile node management system claimed in claim 1, wherein the borne agent surrogate means is configured to change destination addresses of packets sent from the mobile node in the domain to each correspondent node from the NAI or URI to the care-of-address to thereby forward them, and also to change destination addresses of packets sent to the mobile node in the domain from the care-of-address to the NAI or URI to forward them to the mobile node.

3. The mobile node management system claimed in claim 2, wherein the access router further includes a means for receiving a registration request sent from the mobile node when the mobile node moves from one subnetwork to another, and a means for sending the binding update table for the mobile node to the access router in the subnetwork where the mobile node is staying after a move, receiving the binding update table from the access router in the subnetwork where the mobile node stayed befbre it moved, and taking over the local home agent function for the mobile node.

4. The mobile node management system claimed in claim 2, wherein:

the respective subnetworks have diffrrent network prefixes, and the care-of-address of the mobile node comprises the network prefix of the subnetwork where the mobile node is present and the interface ID of the mobile node.

5. The mobile node management system claimed in claim 1, wherein the access router further includes;

a means for receiving a registration request sent from the mobile node when the mobile node moves from one subnetwork to another; and a means for sending the binding update table for the mobile node to the access router in the subnetwork where the mobile node is staying after move, receiving the binding update table from the access router in the subnetwork where the mobile node stayed before it moved, and taking over the local home agent function for the mobile node.

6. The mobile node management system claimed in claim 5, wherein the access router further includes a mobile node surrogate means for, when receiving the binding update table for the mobile node that has moved to its subnetwork, transmitting binding update packets to all correspondent nodes contained in the binding update table to inform them of a new can-of-address of the mobile, and updating the binding update table when receiving binding update packets addressed to mobile nodes in its domain from other access routers.

7. The mobile node management system claimed in claim 1, wherein:

the respective subnetworks have different network prefixes, and the care-of-address of the mobile node comprises the network prefix of the subnetwork where the mobile node is present and the interface ID of the mobile node.

8. The mobile node management system claimed in claim 1, wherein:

the respective subnetworks have different network prefixes, and the care-of-address of the mobile node comprises the network prefix of the subnetwork where the mobile node is present and the interface ID of the mobile node.

* * * * *